United States Patent
Bonnet et al.

(10) Patent No.: US 12,517,124 B2
(45) Date of Patent: Jan. 6, 2026

(54) CHIMERIC RECEPTOR FOR USE IN WHOLE-CELL SENSORS FOR DETECTING ANALYTES OF INTEREST

(71) Applicants: INSERM (Institut National de la Sante et de la Recherche Medicale), Paris (FR); Universite de Montpellier, Montpellier (FR); Centre National de la Recherche Scientifique (CNRS), Paris (FR)

(72) Inventors: Jerome Bonnet, Montpellier (FR); Hung-Ju Chang, Montpellier (FR)

(73) Assignees: INSERM (Institute National de la Sante et de la Recherche Medicale), Paris (FR); Universite de Montpellier, Montpellier (FR); Centre National de la Recherche Scientifique (CNRS), Paris (FR)

( * ) Notice: Subject to any disclaimer, the term of this patent is extended or adjusted under 35 U.S.C. 154(b) by 843 days.

(21) Appl. No.: 16/620,155

(22) PCT Filed: Jun. 7, 2018

(86) PCT No.: PCT/EP2018/065074
§ 371 (c)(1),
(2) Date: Dec. 6, 2019

(87) PCT Pub. No.: WO2018/224611
PCT Pub. Date: Dec. 13, 2018

(65) Prior Publication Data
US 2020/0096507 A1    Mar. 26, 2020

(30) Foreign Application Priority Data

Jun. 8, 2017   (EP) .................................... 17305690
Aug. 9, 2017   (EP) .................................... 17306060

(51) Int. Cl.
G01N 33/566      (2006.01)
C07K 16/18       (2006.01)
(Continued)

(52) U.S. Cl.
CPC ........... *G01N 33/566* (2013.01); *C07K 16/18* (2013.01); *G01N 33/5308* (2013.01);
(Continued)

(58) Field of Classification Search
CPC ............. G01N 33/566; G01N 33/5308; G01N 33/56911; G01N 33/54387;
(Continued)

(56) References Cited

U.S. PATENT DOCUMENTS 6,716,589 B2 *  4/2004  Johansson ............ C07K 1/1136
                                                       435/7.2
7,052,906 B1 *  5/2006  Lawson ................... A61P 37/06
                                                     435/254.2
(Continued)

FOREIGN PATENT DOCUMENTS

WO    WO-9923116 A1 *   5/1999   ........... C07K 14/245
WO    WO-2012031109 A2 *  3/2012  ............. C12N 15/62
(Continued)

OTHER PUBLICATIONS

Zschiedrich et al. "Molecular mechanisms of two-component signal transduction", Sep. 25, 2016, J Mol Biol, 428(19), p. 1-42. (Year: 2016).*
(Continued)

*Primary Examiner* — Gary B Nickol
*Assistant Examiner* — Amelia Nicole Dickens
(74) *Attorney, Agent, or Firm* — WCF IP

(57) ABSTRACT

The present invention relates to chimeric receptors that can be used in whole-cell sensors for detecting analytes of interest. The inventors showed that the DNA binding
(Continued)

domains and downstream gene expression can be activated via dimerization of an artificial dimerization composed of a single chain variable domain. They demonstrated for the first time that an artificial bacterial receptor using an antibody-like domain can be activated and produce a transcriptional output upon ligand-binding. In particular, the present invention relates to a chimeric receptor polypeptide comprising: i) a first DNA binding domain, ii) at least one binding domain selected from the group consisting of heavy chain variable domain, camelid VHHs, or antibody mimetics having specificity for an analyte, and iii) a linker between the DNA binding domain and the binding domain.

12 Claims, 7 Drawing Sheets

Specification includes a Sequence Listing.

(51) Int. Cl.
| | | |
|---|---|---|
| *G01N 33/53* | (2006.01) | |
| *G01N 33/543* | (2006.01) | |
| *G01N 33/554* | (2006.01) | |
| *G01N 33/563* | (2006.01) | |
| *G01N 33/569* | (2006.01) | |
| *G01N 33/68* | (2006.01) | |

(52) U.S. Cl.
CPC ..... *G01N 33/54387* (2021.08); *G01N 33/554* (2013.01); *G01N 33/563* (2013.01); *G01N 33/56911* (2013.01); *G01N 33/6857* (2013.01); *G01N 33/6872* (2013.01); *C07K 2317/80* (2013.01); *C07K 2319/80* (2013.01)

(58) Field of Classification Search
CPC ....... G01N 33/54388; G01N 33/54389; G01N 33/54391; G01N 33/54386; G01N 33/558; G01N 33/554; G01N 33/563; G01N 33/6857; G01N 33/6872; C07K 16/18; C07K 2317/80; C07K 2319/80
See application file for complete search history.

(56) References Cited

U.S. PATENT DOCUMENTS

| | | | | |
|---|---|---|---|---|
| 2003/0049799 A1* | 3/2003 | Schwartz | ............. | C12N 15/635 530/391.1 |
| 2005/0003367 A1* | 1/2005 | Whitney | ............. | C12N 15/907 435/6.16 |

FOREIGN PATENT DOCUMENTS

| | | |
|---|---|---|
| WO | 2012125652 A2 | 6/2012 |
| WO | 2013022739 A1 | 2/2013 |
| WO | WO-2017070554 A1 * | 4/2017 ........... C07K 14/705 |

OTHER PUBLICATIONS

Strauss and Keller, "Pharmacological Interference with Protein-Protein Interactions Mediated by Coiled-Coil Motifs" a chapter from "Protein-Protein Interactions as New Drug Targets", 2008, Handbook of Experimental Pharmacology, vol. 186, p. 461-482. (Year: 2008).*

Makeyev et al. "Cell-free immunology: construction and in vitro expression of a PCR-based library encoding a single-chain antibody repertoire", 1999, FEBS Letters, vol. 444, p. 177-180. (Year: 1999).*

Trainor et al. "Ensemble Modeling and Intracellular Aggregation of an Engineered Immunoglobulin-Like Domain", 2016, Journal of Molecular Biology, vol. 428, p. 1365-1374. (Year: 2016).*

Wikipedia, "Monobody" article, accessed Oct. 4, 2022. Made of record as a supporting reference submitted with remarks Nov. 25, 2022. (Year: 2022).*

Holt et al. "Domain antibodies: proteins for therapy", Nov. 2003, TRENDS in Biotechnology, vol. 21 No. 11, p. 484-490. (Year: 2003).*

Pardee et al. "Paper-based Synthetic Gene Networks", Nov. 6, 2014, Cell, 159(4), p. 940-954. (Year: 2014).*

Roybal et al. "Engineering T Cells with Customized Therapeutic Response Programs Using Synthetic Notch Receptors", Oct. 6, 2016, Cell, vol. 167, p. 419-432. (Year: 2016).*

Tang et al. "A Nanobody-Based System Using Fluorescent Proteins as Scaffolds for Cell-Specific Gene Manipulation", Aug. 14, 2013, Cell, vol. 154 Issue 4, p. 928-939. (Year: 2013).*

Fominaya et al.; "Target Cell-Specific DNA Transfer Mediated by a Chimeric Multidomain Protein. Novel Non-Viral Gene Delivery System"; Journal of Biological Chemistry, vol. 271, No. 18, May 3, 1996, pp. 10560-10568.

Courbet et al.; "Detection of pathological biomarkers in human clinical samples via amplifying genetic switches and logic gates"; Science Translational Medicine, vol. 7, No. 289, May 27, 2015, p. 289ra83.

Lindner et al.; "Topology, Dimerization, and Stability of the Single-Span Membrane Protein CadC"; Journal of Molecular Biology, vol. 426, No. 16, Jun. 16, 2014, pp. 2942-2957.

Kotova et al.; "Two-Hybrid Dual Bait System"; Current Protocols in Molecular Biology, Apr. 1, 2009.

* cited by examiner wtTM (CadC₁₅₆₋₁₈₈): FTTFWVWFFLLSLGICVALVAFSSLDTRLPMS
artTM : GGPGL₁LLLLLLLLLLLLLL₁₅GPGG dominant pages

SEQUENCE LISTING

```
<160> NUMBER OF SEQ ID NOS: 18

<210> SEQ ID NO 1
<211> LENGTH: 151
<212> TYPE: PRT
<213> ORGANISM: Artificial Sequence
<220> FEATURE:
<223> OTHER INFORMATION: Synthetic CadC transcriptional activator

<400> SEQUENCE: 1

Met Gln Gln Pro Val Val Arg Val Gly Glu Trp Leu Val Thr Pro Ser
1               5                   10                  15

Ile Asn Gln Ile Ser Arg Asn Gly Arg Gln Leu Thr Leu Glu Pro Arg
            20                  25                  30

Leu Ile Asp Leu Leu Val Phe Phe Ala Gln His Ser Gly Glu Val Leu
        35                  40                  45

Ser Arg Asp Glu Leu Ile Asp Asn Val Trp Lys Arg Ser Ile Val Thr
    50                  55                  60

Asn His Val Val Thr Gln Ser Ile Ser Glu Leu Arg Lys Ser Leu Lys
65                  70                  75                  80

Asp Asn Asp Glu Asp Ser Pro Val Tyr Ile Ala Thr Val Pro Lys Arg
                85                  90                  95

Gly Tyr Lys Leu Met Val Pro Val Ile Trp Tyr Ser Glu Glu Glu Gly
            100                 105                 110

Glu Glu Ile Met Leu Ser Ser Pro Pro Ile Pro Glu Ala Val Pro
        115                 120                 125

Ala Thr Asp Ser Pro Ser His Ser Leu Asn Ile Gln Asn Thr Ala Thr
    130                 135                 140

Pro Pro Glu Gln Ser Pro Val
145                 150

<210> SEQ ID NO 2
<211> LENGTH: 155
```

```
<212> TYPE: PRT
<213> ORGANISM: Artificial Sequence
<220> FEATURE:
<223> OTHER INFORMATION: Synthetic CadC transcriptional activator DNA
      binding domain

<400> SEQUENCE: 2

Met Gln Gln Pro Val Arg Val Gly Glu Trp Leu Val Thr Pro Ser
1               5                   10                  15

Ile Asn Gln Ile Ser Arg Asn Gly Arg Gln Leu Thr Leu Glu Pro Arg
            20                  25                  30

Leu Ile Asp Leu Leu Val Phe Phe Ala Gln His Ser Gly Glu Val Leu
            35                  40                  45

Ser Arg Asp Glu Leu Ile Asp Asn Val Trp Lys Arg Ser Ile Val Thr
    50                  55                  60

Asn His Val Val Thr Gln Ser Ile Ser Glu Leu Arg Lys Ser Leu Lys
65                  70                  75                  80

Asp Asn Asp Glu Asp Ser Pro Val Tyr Ile Ala Thr Val Pro Lys Arg
                85                  90                  95

Gly Tyr Lys Leu Met Val Pro Val Ile Trp Tyr Ser Glu Glu Glu Gly
            100                 105                 110

Glu Glu Ile Met Leu Ser Ser Pro Pro Ile Pro Glu Ala Val Pro
            115                 120                 125

Ala Thr Asp Ser Pro Ser His Ser Leu Asn Ile Gln Asn Thr Ala Thr
            130                 135                 140

Pro Pro Glu Gln Ser Pro Val Lys Ser Lys Arg
145                 150                 155

<210> SEQ ID NO 3
<211> LENGTH: 24
<212> TYPE: PRT
<213> ORGANISM: Artificial Sequence
<220> FEATURE:
<223> OTHER INFORMATION: Synthetic transmembrane domain

<400> SEQUENCE: 3

Gly Gly Pro Gly Leu Leu Leu Leu Leu Leu Leu Leu Leu Leu Leu
1               5                   10                  15

Leu Leu Leu Leu Gly Pro Gly Gly
            20

<210> SEQ ID NO 4
<211> LENGTH: 26
<212> TYPE: PRT
<213> ORGANISM: Artificial Sequence
<220> FEATURE:
<223> OTHER INFORMATION: Synthetic transmembrane domain

<400> SEQUENCE: 4

Phe Thr Thr Phe Trp Val Trp Phe Phe Phe Leu Leu Ser Leu Gly Ile
1               5                   10                  15

Cys Val Ala Leu Val Ala Phe Ser Ser Leu
            20                  25

<210> SEQ ID NO 5
<211> LENGTH: 24
<212> TYPE: PRT
<213> ORGANISM: Artificial Sequence
<220> FEATURE:
<223> OTHER INFORMATION: Synthetic transmembrane domain
```

```
<400> SEQUENCE: 5

Ile Thr Leu Ile Ile Phe Gly Val Met Ala Ala Gly Val Ile Gly Thr
1               5                   10                  15

Ile Leu Leu Ile Ser Tyr Gly Ile
            20

<210> SEQ ID NO 6
<211> LENGTH: 24
<212> TYPE: PRT
<213> ORGANISM: Artificial Sequence
<220> FEATURE:
<223> OTHER INFORMATION: Synthetic transmembrane domain

<400> SEQUENCE: 6

Leu Leu Leu Ile Leu Leu Gly Val Leu Ala Leu Gly Val Leu Leu Thr
1               5                   10                  15

Leu Leu Leu Leu Leu Leu Leu Leu
            20

<210> SEQ ID NO 7
<211> LENGTH: 7
<212> TYPE: PRT
<213> ORGANISM: Artificial Sequence
<220> FEATURE:
<223> OTHER INFORMATION: Synthetic spacer

<400> SEQUENCE: 7

Asp Thr Arg Leu Pro Met Ser
1               5

<210> SEQ ID NO 8
<211> LENGTH: 186
<212> TYPE: PRT
<213> ORGANISM: Artificial Sequence
<220> FEATURE:
<223> OTHER INFORMATION: Synthetic chimeric recpetor domain

<400> SEQUENCE: 8

Met Gln Gln Pro Val Val Arg Val Gly Glu Trp Leu Val Thr Pro Ser
1               5                   10                  15

Ile Asn Gln Ile Ser Arg Asn Gly Arg Gln Leu Thr Leu Glu Pro Arg
            20                  25                  30

Leu Ile Asp Leu Leu Val Phe Phe Ala Gln His Ser Gly Glu Val Leu
        35                  40                  45

Ser Arg Asp Glu Leu Ile Asp Asn Val Trp Lys Arg Ser Ile Val Thr
    50                  55                  60

Asn His Val Val Thr Gln Ser Ile Ser Glu Leu Arg Lys Ser Leu Lys
65                  70                  75                  80

Asp Asn Asp Glu Asp Ser Pro Val Tyr Ile Ala Thr Val Pro Lys Arg
                85                  90                  95

Gly Tyr Lys Leu Met Val Pro Val Ile Trp Tyr Ser Glu Glu Glu Gly
            100                 105                 110

Glu Glu Ile Met Leu Ser Ser Pro Pro Ile Pro Glu Ala Val Pro
        115                 120                 125

Ala Thr Asp Ser Pro Ser His Ser Leu Asn Ile Gln Asn Thr Ala Thr
    130                 135                 140

Pro Pro Glu Gln Ser Pro Val Lys Ser Lys Arg Gly Gly Pro Gly Leu
145                 150                 155                 160
```

```
Leu Leu Leu Leu Leu Leu Leu Leu Leu Leu Leu Leu Leu Leu Gly
            165                 170                 175

Pro Gly Gly Asp Thr Arg Leu Pro Met Ser
            180                 185

<210> SEQ ID NO 9
<211> LENGTH: 162
<212> TYPE: DNA
<213> ORGANISM: Artificial Sequence
<220> FEATURE:
<223> OTHER INFORMATION: Synthetic promoter

<400> SEQUENCE: 9
atccattgta aacattaaat gtttatcttt tcatgatatc aacttgcgat cctgatgtgt    60
taataaaaaa cctcaagttc tcacttacag aaacttttgt gttatttcac ctaatctta   120 ggattaatcc ttttttcgtg agtaatctta tcgccagttt gg                     162

<210> SEQ ID NO 10
<211> LENGTH: 33
<212> TYPE: PRT
<213> ORGANISM: Artificial Sequence
<220> FEATURE:
<223> OTHER INFORMATION: Synthetic wtTM (CadC156-188)

<400> SEQUENCE: 10

Phe Thr Thr Phe Trp Val Trp Phe Phe Phe Leu Leu Ser Leu Gly Ile
1               5                   10                  15

Cys Val Ala Leu Val Ala Phe Ser Ser Leu Asp Thr Arg Leu Pro Met
            20                  25                  30

Ser

<210> SEQ ID NO 11
<211> LENGTH: 24
<212> TYPE: PRT
<213> ORGANISM: Artificial Sequence
<220> FEATURE:
<223> OTHER INFORMATION: Synthetic artTM

<400> SEQUENCE: 11

Gly Gly Pro Gly Leu Leu Leu Leu Leu Leu Leu Leu Leu Leu Leu Leu
1               5                   10                  15

Leu Leu Leu Leu Gly Pro Gly Gly
            20

<210> SEQ ID NO 12
<211> LENGTH: 5
<212> TYPE: PRT
<213> ORGANISM: Artificial Sequence
<220> FEATURE:
<223> OTHER INFORMATION: Synthetic SEQ ID NO:12

<400> SEQUENCE: 12

Gly Gly Gly Ser Gly
1               5

<210> SEQ ID NO 13
<211> LENGTH: 87
<212> TYPE: PRT
<213> ORGANISM: Artificial Sequence
<220> FEATURE:
<223> OTHER INFORMATION: Synthetic SEQ ID NO:13
```

<400> SEQUENCE: 13

Met Lys Ala Leu Thr Ala Arg Gln Gln Glu Val Phe Asp Leu Ile Arg
1               5                   10                  15

Asp His Ile Ser Gln Thr Gly Met Pro Pro Thr Arg Ala Glu Ile Ala
                20                  25                  30

Gln Arg Leu Gly Phe Arg Ser Ala Ser Ala Glu Glu His Leu Lys
            35                  40                  45

Ala Leu Ala Arg Lys Gly Val Ile Glu Ile Val Ser Gly Ala Ser Arg
    50                  55                  60

Gly Ile Arg Leu Leu Gln Glu Glu Glu Gly Leu Pro Leu Val Gly
65                  70                  75                  80

Arg Val Ala Ala Gly Glu Pro
                85

<210> SEQ ID NO 14
<211> LENGTH: 5
<212> TYPE: PRT
<213> ORGANISM: Artificial Sequence
<220> FEATURE:
<223> OTHER INFORMATION: Synthetic SEQ ID NO:14

<400> SEQUENCE: 14

Gln Glu Glu Glu Glu
1               5

<210> SEQ ID NO 15
<211> LENGTH: 80
<212> TYPE: DNA
<213> ORGANISM: Artificial Sequence
<220> FEATURE:
<223> OTHER INFORMATION: Synthetic SEQ ID NO:15

<400> SEQUENCE: 15
cgaggctctt tccgaaaata gggttgatct ttgttgtcac tggatgtacc tacatccata     60
cggtaactca cagggctgg                                                  80

<210> SEQ ID NO 16
<211> LENGTH: 7
<212> TYPE: PRT
<213> ORGANISM: Artificial Sequence
<220> FEATURE:
<223> OTHER INFORMATION: Synthetic SEQ ID NO:16

<400> SEQUENCE: 16

Asp Thr Arg Leu Pro Met Ser
1               5

<210> SEQ ID NO 17
<211> LENGTH: 5
<212> TYPE: PRT
<213> ORGANISM: Artificial Sequence
<220> FEATURE:
<223> OTHER INFORMATION: Synthetic SEQ ID NO:17

<400> SEQUENCE: 17

Gly Gly Gly Ser Gly
1               5

<210> SEQ ID NO 18
<211> LENGTH: 5
<212> TYPE: PRT
<213> ORGANISM: Artificial Sequence

```
<220> FEATURE:
<223> OTHER INFORMATION: Synthetic SEQ ID NO:18

<400> SEQUENCE: 18

Glu Ala Ala Ala Lys
1               5
```

CHIMERIC RECEPTOR FOR USE IN WHOLE-CELL SENSORS FOR DETECTING ANALYTES OF INTEREST

CROSS-REFERENCE TO RELATED APPLICATIONS

This application is a national stage application of PCT/EP2018/065074 filed Jun. 7, 2018 which claims benefit of European patent application 17306060.9 filed Aug. 9, 2017, and European patent application 17305690.4 filed Jun. 8, 2017, the complete contents of which are herein incorporated by reference.

SEQUENCE LISTING

This application incorporates by reference an electronic sequence listing text file, which was electronically submitted along with this document. The text file is named "2019-12-06_11450604US_SequenceListing", is 10 kilobytes, and was created Nov. 19, 2019.

FIELD OF THE INVENTION

The present invention relates to chimeric receptors that can be used in whole-cell sensors for detecting analytes of interest.

BACKGROUND OF THE INVENTION

In vitro diagnostic tests (IVDs) are growing in importance in the global health arena because of their noninvasive nature and resulting ease of use and scale (1, 2). However, conventional detection methods for IVDs are often expensive and complex, and thus difficult to implement in resource-limited settings (3). In response to these challenges, bioengineers have developed attractive methodologies that rely on synthetic nanoprobes (4-6) or microfluidics (7, 8). Yet, there remains a need for easy-to-use, portable biosensor devices that can be used by nonspecialists to make clinical measurements at home or in remote locations (4, 9, 10). Among biosensing devices, whole-cell biosensors mainly based on bacteria have proven to be applicable for the detection and quantification of a wide range of analytes (11, 12). Living cells have many attractive properties when it comes to diagnostics development. Cells detect biomolecules with high sensitivity and specificity and are capable of integrated and complex signal processing. Cells also provide a self-manufacturing platform via autonomous replication (12, 13), and the production of laboratory prototypes can be scaled using existing industrial frameworks (14). Spores from whole-cell biosensors can remain functional for extended periods of time, increasing the shelf life of a diagnostic product in harsh storage conditions (15). Last, whole-cell biosensors are highly versatile and can be used as stand-alone devices or interfaced with other technologies such as electronics, microfluidics, or micropatterning (16-18). All of these advantages have prompted the development of whole-cell biosensors that measure a variety of clinical parameters (19-24). Many challenges have limited whole-cell biosensor translation to the clinic: (i) unreliable operation and low signal-to-noise ratio in complex and heterogeneous clinical samples; (ii) the inability to engineer ligand-tailored sensors; (iii) limited signal-processing capability, which precludes the integration of several biomarker signals for accurate diagnosis; (iv) lack of consistent frameworks for the assessment of robustness in challenging clinical conditions; (v) response times that are not compatible for diagnosis that require fast delivery of results; and (vi) compliance to clinical formats. The emerging field of synthetic-biology research aims at streamlining the rational engineering of biological systems (25). In the field of health care, synthetic biology has delivered breakthroughs in drug biosynthesis (26-29) and new hope for compelling translational medicine applications (30-32). Recently whole-cell sensors were engineered to be capable of in vivo computation (Courbet A, Endy D, Renard E, Molina F, Bonnet J. Detection of pathological biomarkers in human clinical samples via amplifying genetic switches and logic gates. Sci Transl Med. 2015 May 27; 7(289):289ra83.). However said whole-cell sensors were not convenient for detecting novel analytes for which no natural sensing machinery exists. Moreover, these biosensors could not detect analytes that cannot cross bacterial wall and membrane.

SUMMARY OF THE INVENTION

The present invention relates to chimeric receptors that can be used in whole-cell sensors for detecting analytes of interest. In particular, the present invention is defined by the claims.

DETAILED DESCRIPTION OF THE INVENTION

The present invention relates to a chimeric receptor polypeptide comprising i) a first DNA binding domain, ii) at least one binding domain having specificity for an analyte, and iii) a linker between the DNA binding domain and the binding domain.

As used herein, the term "DNA binding domain" refers to, but is not limited to, a motif that can bind to a specific DNA sequence (e.g., a genomic DNA sequence). DNA binding domains have at least one motif that recognizes and binds to single-stranded or double-stranded DNA. DNA binding domains can interact with DNA in a sequence-specific or a non-sequence-specific manner.

As used herein, the term "LexA" or "LexA binding domain" refers to a protein or domain that is naturally encoded in E. coli by the lexA gene. LexA is a well-characterized transcriptional repressor which participates in bacterial SOS response. It is composed of a N-terminal DNA binding domain and a C-terminal dimerization/catalytic domain. When SOS response starts, the active form of RecA interacts with the LexA repressor to promoter the self-cleavage of its dimerization domain and releases from the operator.

In some embodiments, the LexA DNA binding domain comprises an amino acid sequence having at least 70% of identity with SEQ ID NO:13.

As used herein the term "CadC transcriptional activator" has its general meaning in the art and refers to the membrane-integrated transcriptional regulator CadC of *Escherichia coli*. CadC activates expression of the cadBA operon at low external pH with concomitantly available lysine, providing adaptation to mild acidic stress. CadC is a representative of the ToxR-like proteins that combine sensory, signal transduction, and DNA-binding activities within a single polypeptide. Specifically, CadC is composed of a C-terminal periplasmic pH-sensing domain, a single transmembrane helix and an N-terminal cytoplasmic winged helix-turn-helix DNA-binding domain (Buchner S, Schlundt A, Lassak J, Sattler M, Jung K. Structural and Functional Analysis of the Signal-Transducing Linker in the pH-Responsive One- Component System CadC of *Escherichia coli*. J Mol Biol. 2015 Jul. 31; 427(15):2548-61.). CadC dimerizes via its its C-terminal periplasmic pH-sensing domain. Thus the expression "*E coli* CadC transcriptional activator DNA binding domain" refers to the cytoplasmic domain of CadC that is capable of restoring its function via oligomerization of its C-terminal fusion domain.

In some embodiments, the *E coli* CadC transcriptional activator DNA binding domain comprises an amino acid sequence having at least 70% of identity with SEQ ID NO:1. In some embodiments, the CadC transcriptional activator DNA binding domain comprises an amino acid sequence having at least 70% of identity with SEQ ID NO: 2.

As used herein, the term "binding domain" refers to one or more regions of a polypeptide that mediate specific binding with a target molecule (e.g. an analyte). The binding domain allows the receptor to bind a molecule that is not usually recognized by the natural receptor binding domain. The term "binding" refers to a non-covalent, preferably reversible binding of a molecule to the binding domain portion. Preferably, such binding involves non-covalent interactions such as salt bridges, hydrogen bonds, van der Waal forces, stacking forces, complex formation or combinations thereof between the compound and the binding domain portion. It also includes interactions with water molecules in the binding pocket. Exemplary binding domains include an antibody variable domain, a receptor binding domain of a ligand, a ligand binding domain of a receptor or an enzymatic domain. The term "ligand binding domain" as used herein refers to any native receptor (e.g., cell surface receptor) or any region or derivative thereof retaining at least a qualitative ligand binding ability of a corresponding native receptor. The term "receptor binding domain" as used herein refers to any native ligand or any region or derivative thereof retaining at least a qualitative receptor binding ability of a corresponding native ligand. In some embodiments, the binding domain of the present invention comprises at least 1, 2, 3, 4, or 5 binding sites. The binding domain may be either monomers or multimers.

In some embodiments, the binding domain is an antibody. The term "antibody" is thus used to refer to any antibody-like molecule that has an antigen binding region. In some embodiments, the binding domain is a single heavy chain variable domain of antibodies of the type that can be found in Camelid mammals which are naturally devoid of light chains. Such single domain antibody are also called VHH or "Nanobody®". For a general description of (single) domain antibodies, reference is also made to the prior art cited above, as well as to EP 0 368 684, Ward et al. (Nature 1989 Oct. 12; 341 (6242): 544-6), Holt et al., Trends Biotechnol., 2003, 21(11):484-490; and WO 06/030220, WO 06/003388.

As used herein, the term "camelid VHHs" refers to the variable region of a single domain antibody found in camelids.

As used herein, the term "antibody mimetic" is intended to describe an organic compound that specifically binds a target sequence and has a structure distinct from a naturally-occurring antibody. Antibody mimetics may comprise a protein, a nucleic acid, or a small molecule.

In some embodiments, the antibody mimetics is selected from the group consisting of monobodies, DARPin®s (designed ankyrin repeat proteins), or alphaReps.

The term "monobodies" as used herein, refers to antigen binding molecules with a heavy chain variable domain and no light chain variable domain.

As used herein, the term "DARPin®s" refers to designed ankyrin repeat proteins, which are genetically engineered antibody mimetic proteins typically exhibiting highly specific and high-affinity target protein binding.

As used herein, the term "alphaReps" refers to artificial helicoidal repeat proteins.

As used herein, the term "analyte" refers to compounds that can be bound by at least two chimeric receptors of the present and/or generate a conformational change in the chimeric receptor of the present invention thus allowing the oligomerization of the CadC transcriptional activator DNA binding domain or the dimerization of the LexA transcriptional repressor binding domain. In some embodiments, the analyte is selected from the group consisting of sugars, amino acids, peptides, proteins, nucleic acids, organic acids, anions, metals (e.g. molybolate, mercury, iron, zinc or nickel) or ions, oxides, hydroxides or conjugates thereof, inorganic ions (e.g. phosphate, sulfate or thiosulfate), polyamines and vitamins. As used herein, the term "specificity" refers to the ability of the binding domain of the chimeric receptor of the present invention to bind the analyte of interest, while having relatively little detectable reactivity with others analytes. Specificity can be relatively determined by binding or competitive binding assays, using, e.g., Biacore instruments, as described elsewhere herein. Specificity can be exhibited by, e.g., an about 10:1, about 20:1, about 50:1, about 100:1, 10.000:1 or greater ratio of affinity/avidity in binding to the specific antigen versus nonspecific binding to other irrelevant molecules. The term "affinity", as used herein, means the strength of the binding of an antibody to an epitope. For example, the affinity of an antibody is given by the dissociation constant Kd, defined as $[Ab] \times [Ag]/[Ab-Ag]$, where [Ab-Ag] is the molar concentration of the antibody-antigen complex, [Ab] is the molar concentration of the unbound antibody and [Ag] is the molar concentration of the unbound antigen. The affinity constant Ka is defined by 1/Kd. Preferred methods for determining the affinity of mAbs can be found in Harlow, et al., Antibodies: A Laboratory Manual, Cold Spring Harbor Laboratory Press, Cold Spring Harbor, N.Y., 1988), Coligan et al., eds., Current Protocols in Immunology, Greene Publishing Assoc. and Wiley Interscience, N.Y., (1992, 1993), and Muller, Meth. Enzymol. 92:589-601 (1983), which references are entirely incorporated herein by reference. One preferred and standard method well known in the art for determining the affinity of mAbs is the use of Biacore instruments.

In some embodiments, the chimeric receptor polypeptide of the invention comprises two single heavy chain variable domains which target two different epitopes.

As used herein, the term "linker" refers to a sequence of at least one amino acid that links the DNA binding domain and the single heavy chain variable domain.

In some embodiments, the linker comprises an amino acid sequence having at least 50% of identity with SEQ ID NO:14.

In some embodiments, the linker between the DNA binding domain and the single heavy chain variable domain is a transmembrane domain.

As used "transmembrane domain" refers to a domain natural or not (i.e. artificial) that spans the membrane of *E coli* bacterium and links the CadC transcriptional activator DNA binding domain to the binding domain having specificity for an analyte. Such transmembrane domain is composed of 18-25 mostly apolar amino acids and is responsible for the insertion and achoring of chimeric receptor polypeptide into membrane to form a cytoplasmic N-terminal (CadC transcriptional activator DNA binding domain) and an exoplasmic C-terminus (binding domain) topology. In addition, to avoid interfering with the oligomerization triggered by the ligand binding domain, the transmembrane domain has to be monomeric with in lipid bilayers. Such transmembrane domains are characterized in Zhou et al., Proc. Natl. Acad. Sci. U.S.A., 98:2250, 2001; Lindner et al., J. Mol. Biol., 426:2942-2957, 2014.

In some embodiments, the transmembrane domain comprises an amino acid sequence having at 50% of identity with SEQ ID NO:3 to NO:6.

In some embodiments, the transmembrane domain further comprises an extracellular spacer inserted between the transmembrane domain and the binding domain. As used herein, the term "spacer" refers to a sequence of at least one amino acid that links the transmembrane domain with the binding domain. Such a spacer may be useful to prevent steric hindrances. Typically, said spacer is an amino acid sequence consisting of DTRLPMS (SEQ ID NO:7) or an amino acid sequence consisting of GGGSG (SEQ ID NO:12).

According to the present invention, all the domains containing in the chimeric receptor of the present invention are fused in frame, i.e. operably linked to each other.

In some embodiments, the chimeric receptor of the present invention comprises a first domain comprising an amino acid sequence having at least 70% of identity with SED ID NO:8 fused to a binding domain.

According to the present invention a first amino acid sequence having at least 50% of identity with a second amino acid sequence means that the first sequence has 50; 51; 52; 53; 54; 55; 56; 57; 58; 59; 60; 61; 62; 63; 64; 65; 66; 67; 68; 69; 70; 71; 72; 73; 74; 75; 76; 77; 78; 79; 80; 81; 82; 83; 84; 85; 86; 87; 88; 89; 90; 91; 92; 93; 94; 95; 96; 97; 98; 99; or 100% of identity with the second amino acid sequence. According to the present invention a first amino acid sequence having at least 70% of identity with a second amino acid sequence means that the first sequence has 70; 71; 72; 73; 74; 75; 76; 77; 78; 79; 80; 81; 82; 83; 84; 85; 86; 87; 88; 89; 90; 91; 92; 93; 94; 95; 96; 97; 98; 99; or 100% of identity with the second amino acid sequence. Sequence identity is frequently measured in terms of percentage identity (or similarity or homology); the higher the percentage, the more similar are the two sequences. Methods of alignment of sequences for comparison are well known in the art. Various programs and alignment algorithms are described in: Smith and Waterman, Adv. Appl. Math., 2:482, 1981; Needleman and Wunsch, J. Mol. Biol., 48:443, 1970; Pearson and Lipman, Proc. Natl. Acad. Sci. U.S.A., 85:2444, 1988; Higgins and Sharp, Gene, 73:237-244, 1988; Higgins and Sharp, CABIOS, 5:151-153, 1989; Corpet et al. Nuc. Acids Res., 16:10881-10890, 1988; Huang et al., Comp. Appls Biosci., 8:155-165, 1992; and Pearson et al., Meth. Mol. Biol., 24:307-31, 1994). Altschul et al., Nat. Genet., 6:119-129, 1994, presents a detailed consideration of sequence alignment methods and homology calculations. By way of example, the alignment tools ALIGN (Myers and Miller, CABIOS 4:11-17, 1989) or LFASTA (Pearson and Lipman, 1988) may be used to perform sequence comparisons (Internet Program® 1996, W. R. Pearson and the University of Virginia, fasta20u63 version 2.0u63, release date December 1996). ALIGN compares entire sequences against one another, while LFASTA compares regions of local similarity. These alignment tools and their respective tutorials are available on the Internet at the NCSA Website, for instance. Alternatively, for comparisons of amino acid sequences of greater than about 30 amino acids, the Blast 2 sequences function can be employed using the default BLOSUM62 matrix set to default parameters, (gap existence cost of 11, and a per residue gap cost of 1). When aligning short peptides (fewer than around 30 amino acids), the alignment should be performed using the Blast 2 sequences function, employing the PAM30 matrix set to default parameters (open gap 9, extension gap 1 penalties). The BLAST sequence comparison system is available, for instance, from the NCBI web site; see also Altschul et al., J. Mol. Biol., 215:403-410, 1990; Gish. & States, Nature Genet., 3:266-272, 1993; Madden et al. Meth. Enzymol., 266:131-141, 1996; Altschul et al., Nucleic Acids Res., 25:3389-3402, 1997; and Zhang & Madden, Genome Res., 7:649-656, 1997.

A further aspect of the present invention relates to a nucleic acid encoding for a chimeric receptor of the present invention. As used herein, the term "nucleic acid molecule" has its general meaning in the art and refers to a DNA or RNA molecule. However, the term captures sequences that include any of the known base analogues of DNA and RNA such as, but not limited to 4-acetylcytosine, 8-hydroxy-N6-methyladenosine, aziridinylcytosine, pseudoisocytosine, 5-(carboxyhydroxylmethyl) uracil, 5-fluorouracil, 5-bromouracil, 5-carboxymethylaminomethyl-2-thiouracil, 5-carboxymethyl-aminomethyluracil, dihydrouracil, inosine, N6-isopentenyladenine, 1-methyladenine, 1-methylpseudouracil, 1-methylguanine, 1-methylinosine, 2,2-dimethylguanine, 2-methyladenine, 2-methylguanine, 3-methylcytosine, 5-methylcytosine, N6-methyladenine, 7-methylguanine, 5-methylaminomethyluracil, 5-methoxyamino-methyl-2-thiouracil, beta-D-mannosylqueosine, 5'-methoxycarbonylmethyluracil, 5-methoxyuracil, 2-methylthio-N6-isopentenyladenine, uracil-5-oxyacetic acid methylester, uracil-5-oxyacetic acid, oxybutoxosine, pseudouracil, queosine, 2-thiocytosine, 5-methyl-2-thiouracil, 2-thiouracil, 4-thiouracil, 5-methyluracil, -uracil-5-oxyacetic acid methylester, uracil-5-oxyacetic acid, pseudouracil, queosine, 2-thiocytosine, and 2,6-diaminopurine.

Furthermore, the present invention relates to an expression cassette comprising the nucleic acid molecule of the present invention and operably linked thereto control sequences allowing expression in a prokaryotic cell. Suitable expression control sequences include promoters that are applicable in the target host organism. Such promoters are well known to the person skilled in the art for diverse hosts from prokaryotic organisms and are described in the literature. For example, such promoters can be isolated from naturally occurring genes or can be synthetic or chimeric promoters. Likewise, the promoter can already be present in the target genome and will be linked to the nucleic acid molecule by a suitable technique known in the art, such as for example homologous recombination. Expression cassettes according to the invention are particularly meant for an easy to use insertion into target nucleic acid molecules such as vectors or genomic DNA. For this purpose, the expression cassette is preferably provided with nucleotide sequences at its 5'- and 3'-flanks facilitating its removal from and insertion into specific sequence positions like, for instance, restriction enzyme recognition sites or target sequences for homologous recombination as, e.g. catalyzed by recombinases.

The present invention also relates to vectors, particularly plasmids, cosmids, viruses and bacteriophages used conventionally in genetic engineering, that comprise a nucleic acid molecule or an expression cassette of the present invention. In some embodiments, the vectors of the present invention are suitable for the transformation of prokaryotic cells. Methods which are well known to those skilled in the art can be used to construct recombinant vectors. In addition to the nucleic acid molecule or expression cassette of the present invention, the vector may contain further genes such as marker genes which allow for the selection of said vector in a suitable host cell and under suitable conditions. Generally, the vector also contains one or more origins of replication. Advantageously, the nucleic acid molecules contained in the vectors are operably linked to expression control sequences allowing expression, i.e. ensuring transcription and synthesis of a translatable RNA, in prokaryotic cells. For genetic engineering, e.g. in prokaryotic cells, the nucleic acid molecules of the present invention or parts of these molecules can be introduced into plasmids. Expression vectors have been widely described in the literature. As a rule, they contain not only a selection marker gene and a replication origin ensuring replication in the host selected, but also a bacterial promoter and, in most cases, a termination signal for transcription. Between the promoter and the termination signal, there is in general at least one restriction site or a polylinker which enables the insertion of a coding nucleotide sequence. It is possible to use promoters ensuring constitutive expression of the gene and inducible promoters which permit a deliberate control of the expression of the gene. Bacterial promoter sequences possessing these properties are described in detail in the literature. Regulatory sequences for the expression in microorganisms (for instance *E. coli*) are sufficiently described in the literature. Inducible promoters are also possible. These promoters often lead to higher protein yields than do constitutive promoters.

Furthermore, the invention relates to a method for producing a prokaryotic cell capable of expressing the chimeric receptor of the present invention comprising genetically engineering cells with an above-described nucleic acid molecule, expression cassette or vector of the present invention.

Another object of the present invention thus relates to a prokaryotic cell genetically engineered with an above-described nucleic acid molecule, expression cassette or vector of the present invention, and to cells descended from such transformed cells and containing a nucleic acid molecule, expression cassette or vector of the present invention and to cells obtainable by the above-mentioned method for producing the same.

In some embodiments, the prokaryotic cells is selected among gram-positive or gram-negative bacteria. In some embodiments, the prokaryotic cell is *E. coli*. In some embodiments, the prokaryotic cell is genetically engineered in such a way that it contains the introduced nucleic acid molecule stably integrated into the genome. The transformation of the prokaryotic cell with a nucleic acid molecule or vector according to the invention can be carried out by standard methods. For example, calcium chloride transfection is commonly utilized for prokaryotic cells. The prokaryotic cell is cultured in nutrient media meeting the requirements of the particular prokaryotic cell used, in particular in respect of the pH value, temperature, salt concentration, aeration, antibiotics, vitamins, trace elements etc. In some embodiments, the prokaryotic cell of the present invention comprises at least one detection protein for which the expression is under the control of the chimeric receptor of the present invention.

In particular, in some embodiments, the binding of the analyte to the chimeric receptor triggers its oligomerization and thus allowing the oligomerization of the CadC tranScriptional activator DNA binding domain which can then activate the expression of at least one detection protein which is placed under the control of CadBA promoter. Accordingly, the prokaryotic cell of the present invention further comprises a nucleic acid molecule encoding for a detection protein operatively linked to a CadBA promoter. An exemplary nucleic acid for the CadBA promoter is represented by SEQ ID NO:9.

In another embodiment, the binding of the analyte to the chimeric receptor triggers its dimerization and its binding to the LexA operator, blocking expression of the reporter gene. Accordingly, the prokaryotic cell of the present invention further comprises a nucleic acid molecule encoding for a detection protein operatively linked to a LexA promoter. An exemplary nucleic acid for the LexA promoter is represented by SEQ ID NO:15.

In some embodiments, the detection protein refers to any protein that can be detected by biological or physical means. In some embodiments, the detection protein is a fluorescent protein. The advent of fluorescent proteins has allowed non-invasive intracellular labeling, which are easily detectable by optical means. The green fluorescent protein (GFP) from *Aequorea victoria* is now the most widely used reporter gene in many organisms. Multiple variants with different spectral properties have been developed. In some embodiments, the prokaryotic cell comprises different combinations of fluorescent proteins exhibiting energy transfer provide for differential fluorescence. In some embodiments, the detection protein is selected among luminescent proteins. Certain bacteria (e.g., *Vibrio fischeri*) have autoinducible luminescent genes that express luciferase, which causes cleaving of luciferin and emission of blue light. Bacteria produce signal molecules, N-acyl homoseine lactones (AELs) that enter bacterial cells and induce transcriptional activation of the genes LuxI, which encodes AHL synthetase, and LuxR, which encodes the AHL-dependent transcriptional activator. A sufficiently high concentration of AHL in the cell causes binding to the LuxR activator and transcription of the luminescence genes. Alternatively, the detection proteins can be fusion proteins (e.g., green fluorescent protein-Fv) that have a detectable property and that are secreted from the cell. Thus, the secretion can be triggered by analyte binding to the chimeric receptor of the present invention. In this case, the detection protein is produced in excess rather than in proportion to the analyte binding. In some embodiments, the detection can be performed using RNA aptamers specifically binding a fluorescent probe. Binding of the probe to the aptamer increases its fluorescence and allows detection of gene expression. Other kind of output signals include production of pigments via specific operons (like the violacein operon, or the expression of Flavin Mono Oxydase converting tryptophane into indigo), or by the expression of an enzyme which substrate exogenously supplied is transformed in a colorimetric product, like the enzyme Beta-galactosidase and its substrate X-gal for example. More complex prokaryotic cells with higher levels of functionality can be created using techniques developed in the field of cellular computation. In these methods, a cell serves as a biochemical computer, processing an input such as analyte binding using internal logic gates to generate an output. Complex conditional responses to multiple inputs have been engineered for example by implementing AND, NOT, OR, XOR, and IMPLIES logic gates in *E. coli* cells. For instance, these gates can be implemented using DNA-binding proteins to regulate expression of recombinant vectors. Others systems can be used, such as, but not limited to, recombinase-based logic gates, nucleic acids-based logic gates, or protein-based logic gates. For more information on cellular computing, see R. Weiss, "Cellular Computation and Communications using Engineered Genetic Regulatory Networks," Ph.D. Thesis, M I T, 2001; M. L. Simpson et al., "Whole-cell biocomputing," Trends Biotechnol. 19:317-323

(2001); Yaakov Benenson., «Biomolecular computing systems: principles, progress and potential». «Nature Reviews Genetics, 13(7):455{468, 2012; Bonnet et al., "Amplifying genetic logic gates" Science, 340(6132):599{603, 2013; Brophy J A N and Voigt C A. «Principles of genetic circuit design». Nature methods, 11(5):508{520, 2014, all of which are incorporated herein by reference.

In some embodiments, the output can be a signal proportional to the amount of analyte binding and nature of the analyte. A single plasmid can be created with different promoters switched on by different binding events to control expression of different detection proteins.

In some embodiments, the output can control a genetic switch that can be tuned to respond to a particular signal threshold. For example, such switches have been engineered by using different verions of recombinases having various translational and/or proteolysis control elements, allowing the response threshold to be tuned over several orders of magnitudes (see Courbet et al., "Detection of pathological biomarkers in human clinical samples via amplifying genetic switches and logic gates". Sci Transl Med. 2015 May 27; 7(289):289ra83.). Using such switches, the whole cell biosensing system can be tuned to respond to specific signal threshold that have been determined to be clinically or environmentally relevant.

In some embodiments, the prokaryotic cell is L-form bacteria. As used herein, the term "L-form bacteria" (or "L-phase bacteria", "L-phase variants", and "cell wall-deficient (CWD) bacteria") refers to strains of bacteria that lack cell walls. See EXAMPLE 4.

The prokaryotic cell of the present invention constitutes whole-cells biosensor that can be suitable for the detection and quantification of analytes.

Accordingly a further object of the present invention relates to a method for assaying for at least one analyte, comprising i) providing at least one set of prokaryotic cells of the present invention, each comprising a chimeric receptor capable of binding to said analyte coupled to one detection protein; b) contacting said set of cells with a sample suspected of containing said analyte for a time sufficient allowing the oligomerization of the chimeric receptors binding and then the expression of the detection protein; and c) detecting the expression level of the detection protein wherein the expression level correlated with the amount of the analyte present in the sample.

With the method of the present invention, it is possible to measure the concentration of a given analyte solved in the sample over a molar range of several orders of magnitude.

As used herein, the term "sample" refers to any volume of a liquid or suspension in which an analyte to be measured can be present in solution. In some embodiments, the sample is bodily fluid sample. In some embodiments, the sample is selected from the group consisting of blood samples (including serum or plasma samples), urine samples, cerebrospinal samples, tear samples, saliva samples and synovial samples.

The whole-cell sensors of the present invention may be used in multiplexed assays. Multiple analytes of interest in a single sample can be detected simultaneously through their capture by different cell types or subsets. For example, an assay may be set up so that each cell type has a unique chimeric receptor of the present invention specific for an analyte of interest and a unique detection protein. That is, there is a one-to-one relationship between the analyte and the whole cell sensor. The amount of analyte captured and identity of each cell are detected to determine the amount of each analyte in the original sample. Note that the cells can also be used in assays for a single analyte or in multiple spatially separated assays. This can be useful when multiple assays are performed in separate wells of a microtiter plate.

Each well contains a different cell type, and the identity of the cell in each well is confirmed by detecting the cell identifier. Furthermore the presence of logic gates in the whole-cell sensor of the present invention allows the detection of different analytes present in the sample by single whole-cell sensor of the present. In particular, the whole-cell sensor of the present invention can include two or more transcriptional units and form OR, XOR, AND, or other kinds of logic gates. For example, one way to build such logic gates would be to have a first transcriptional unit including a first gene and a first promoter while the second transcriptional unit would include a second gene and a second promoter. Both promoters can have equivalent gene transcription effects. In the case of an OR gate, the first gene can be joined to its promoter in a sense orientation and the second gene can be joined to the second promoter in an anti-sense orientation, the second gene positioned upstream from the first gene. In said embodiment, the presence of at least one analyte or the presence of the two analytes can be detected. In the case of an AND gate, the binding of two analytes can control the expression of two different recombinase each inverting one of a pair of asymmetric transcriptional terminator placed between a promoter and a reporter gene, as exemplified in Bonnet et al., "Amplifying genetic logic gates" Science, 340(6132):599{603, 2013. In said embodiments, only the presence of the two analytes can be detected. Other logic functions can be produced, as exemplified, but not limited to, the ones depicted in Bonnet et al. 2013.

The detection proteins in each cell are assayed for and detected to quantify the bound analyte. Typically, when the detection protein is a fluorescent protein, the fluorescence intensity on each cell can be read by methods known in the art such as flow cytometry, laser scanning cytometry, or imaging microscopy. In this way, the fluorescence intensity in all desired wavelength ranges on each individual cell can be detected. From this information, the analyte amount on each cell and the identity of each cell can be determined. The amount or concentration of analyte in the original sample can then be determined using standard methods. In some embodiments, a calibration curve is constructed by measuring the detection protein expression (i.e., its fluorescence) when the cells are combined with samples containing known concentrations of analyte. As long as a reproducible curve can be constructed, it is not necessary that the response be linear. The measured fluorescence intensity of the detection protein during an assay can then be correlated with the analyte concentration in the sample using the calibration curve.

It will be appreciated by persons skilled in the art that the method of the present invention may be used in the detection, identification and quantification of analytes in biological and non-biological samples, such as the diagnosis of disease and infectious agents in medicine, veterinarian science and phytopathology, toxicology testing, analysis of metabolic products in living organisms, quality assurance through contaminant detection and monitoring of environmental pollution. These applications can be either commercial (in the sense of routine analyses) or serve pure research purposes. Because the method of the present invention may be employed using a virtually limitless variety of modalities, it enables the specific detection of thousands of different analytes. The method of the present invention may also be used to discriminate between different cell types or different developmental stages of a single cell/tissue, depending on which the analytes produced by the cells. In this way, the early detection of disease development (such as cancer) may be facilitated. To the degree that the whole-cell sensors are not destroyed, they may be reusable. The method of the present invention can thus be utilized to address complex detection of analytes in areas such as complex environmental monitoring such as diagnostics and bioprocessing. The whole-cell sensors of the present invention can also be also used as a medical diagnostics and disease management in the case of in vitro assays but also in the form of implantable sensors. The whole-cell sensor of the present invention could also be converted into a therapeutic device by linking the detection of pathological biomarker or a pathological biomarkers signature to the activation of a downstream pathway directing the synthesis of a drug (like taxol in *E. coli*, see Stephanopoulos), or other molecular devices capable of triggering target cell death or delivering therapeutic molecules to the target cell. A biosensor device can be formed using the whole cell sensors of the present invention to be deployed in a microenvironment or microfluidic devices, or a collection of these devices in a multi-chip module or distributed wireless network. The biosensor device can respond to one or more specific chemical and/or physical inputs (e.g. heat or electrical current), accessing a small part of the DNA memory of the cell by addressing a particular promoter, generating outputs in the form of detection protein, and communicating with a physical transducer through calorimetric, electrochemical, or preferably fluorescence bioluminescence means.

In some embodiments, the chimeric receptor polypeptide of the present invention may be used in a cell-free system. As used herein, the term "cell-free system" refers to a set of reagents capable of providing for or supporting a biosynthetic reaction in vitro in the absence of cells. For example, to provide for a transcription reaction, a cell-free system comprises promoter-containing DNA, RNA polymerase, ribonucleotides, and a buffer system. Cell-free systems can be prepared using enzymes, coenzymes, and other subcellular components either isolated or purified from eukaryotic or prokaryotic cells, including recombinant cells, or prepared as extracts or fractions of such cells. A cell-free system can be derived from a variety of sources, including, but not limited to, eukaryotic and prokaryotic cells, such as bacteria, rabbit reticulocytes, mouse cells, human cell lines, primary human cell lines and budding yeast and the like. For instance, the chimeric receptor polypeptide of the present invention may be used in any vehicle, including cellular extracts prepared from living cells. For example, the vehicle may be used in a solution containing reconstituted components necessary for transcription and translation. Such a system may comprise a low-ionic-strength buffer (e.g., physiological salt, such as simple saline or phosphate- and/or Tris-buffered saline or other as described above), or a whole or fractionated cell lysate.

In some embodiments, the chimeric receptor polypeptide of the present invention is embedded partially or completely in a solid support, preferably in a porous substrate. The solid support can be in any form including, but is not limited to, a well, a tube, a planar substrate (e.g., a chip or a plate), a sphere, a porous substrate (e.g., a mesh or a foam), a 3D scaffold, a patterned surface (e.g., nano-patterns, or micro-patterns, or both), a porous or solid bead, a hydrogel, a channel (e.g., a microfluidic channel), a smooth surface, and a rough surface. In a preferred embodiment, the solid support is hydrophilic and preferably a porous substrate. As used herein, the term "porous substrate" refers to a substrate that contain pores or interstices via which a liquid composition may penetrate the substrate surface. Paper is one example of a porous substrate. Thus, in some embodiments, the porous substrate comprises paper. In some embodiments, the solid support comprises several (1, 2, 3, 4, 5, 6, 7, 8, 9, 10, 20, or more) spatially distinct reaction regions where the cell-free system is confined. The area that contains the cell-free system is herein referred to as "a reaction region." By way of example only, reaction regions can be created by a chemical process such as using hydrophobic barriers on a piece of paper. The hydrophobic barriers are minimally permeable by water. When an aqueous solution comprising the cell-free system is added to a reaction region, due to the presence of the hydrophobic barrier, the solution is confined within the reaction regions. The hydrophobic barrier can comprise hydrophobic materials such as hydrophobic polymer or wax. The hydrophobic barrier can be patterned by any existing patterning method (e.g., micro-contact printing, or dip pen lithography, photolithography, e-beam lithography, laser printing, inject printing, or a micro-arrayer). Methods of creating hydrophobic patterns on paper are known in the art; see for example, WO2009121041 and WO2008/049083, the contents of each of which are incorporated by reference for the hydrophobic patterning methods. In some embodiments, the solid support comprises one or more fluidic channels (e.g., microfluidic channels) that connect reaction regions with an area for adding an aqueous sample. In this embodiment, when an aqueous sample is added to the area, the fluid is wicked away to the reaction regions, thereby a plurality of reaction regions can be activated by the same sample. In some embodiments, the solid support is a reaction chip. The reaction chip can comprise a sample hosting layer, a light blocking layer, a hydration layer, a transparent layer, a humidity maintaining layer, and a water vapor permeable layer. The hydration layer can comprise a hydrated material or chamber that provides humidity during incubation and/or measurement. The humidity maintaining layer can be water impermeable. The water vapor permeable layer can regulate humidity for the sample.

In some embodiments, the cell-free system functions as a sensor. In some embodiments, the sensor can detect an analyte. When the analyte contacts the cell free system, the analyte activates the sensor, which produces a signal, indicating the detection of the analyte. In some embodiments, the signal is optical. Without limitation, an optical signal can be fluorescence, luminescence, absorption or reflection of a given wavelength, ultraviolet, visible color, or infrared. In some embodiments, the sensor comprises a reporter component. The function of the reporter component is to produce a detectable signal when an analyte is detected. In some embodiments, the reporter component comprises a reporter gene. A reporter gene encoding any fluorescent protein can be applicable in the invention. The fluorescent protein includes, but is not limited to, for example, GFP, mCherry, Venus, and Cerulean. Examples of genes encoding fluorescent proteins that can be used in accordance with the compositions and methods described herein include, without limitation, those proteins provided in U.S. Patent Application No. 2012/0003630, incorporated herein by reference. Similarly, a reporter gene encoding any enzyme can be applicable as well. Enzymes that produce colored substrates ("colorimetric enzymes") can also be used for visualization and/or quantification. Enzymatic products can be quantified using spectrophotometers or other instruments that can take absorbance measurements including plate readers (for example, see FIG. 26). Examples of genes encoding colorimetric enzymes that can be used in accordance with the compositions and methods described herein include, without limitation, lacZ alpha fragment, lacZ (encoding beta-galactosidase, full-length), and xylE. An enzyme (e.g., glucose oxidase or glucose deshydrogenase (Scognamiglio, V. Nanotechnology in glucose monitoring: advances and challenges in the last 10 years Biosens. Bioelectron. 2013, 47, 12-25) can also change the conductivity of a reaction volume, permitting an electrical or electronic readout (Malitesta et al., Anal Chem 1990, 62, 2735-2740). In another example, a nuclease enzyme can cleave a nucleic acid sequence such that an electronic and optical signal is generated. In yet another example, an enzyme can separate a fluorescence resonance energy transfer (FRET) or quenching pair to induce a change in fluorescence. In some embodiments of sensors producing fluorescent signals, it would be apparent to a skilled artisan that any commercial or homemade device or system that can detect fluorescence can be used for the purpose of detecting the signals, including, but not limited to, a microscope, a fluorescence microplate reader, and a fluorescence spectrometer.

In some embodiments, the cell-free system comprises a logic circuit, and thus can perform one or more logic functions upon activation. In the field of synthetic biology, significant progress has been made in designing and assembling biological components into logic circuits that can mimic or even outperform electronic circuits, resulting in the creation of a large variety of logic circuits. In some embodiments, the logic circuit can be activated by contacting the logic circuit with water and a composition comprising one or more analytes. By way of examples only, an AND gate is one of the most basic logic circuits, requiring the simultaneous presence of two appropriate analytes in order for the AND gate to turn on. If only one of the analytes is present, the AND gate would not turn on.

In some embodiments, the cell-free system is lyophilized on the solid support and thus may be reactivated upon hydration. Lyophilization, also known as freeze-drying, is a dehydration process that involves freezing a material and then reducing the surrounding pressure to allow water to sublimate. Parameters such as freezing temperature, rate of temperature change, and pressure are variables for different lyophilization process. Accordingly, the lyophilization processes used in the methods and compositions herein are not limited to a specific set of parameters. It should be apparent to a skilled artisan that preferred lyophilization processes would yield a shelf-stable composition with a long shelf life. Once the cell-free systems and/or cell-free systems are frozen, they should be kept frozen, i.e., prevented from thawing, until the application of low pressure (e.g., vacuum). This can present a challenge when time is needed to transport low-volume frozen cell-free systems and/or cell-free systems to the lyophilizer. This can be addressed, for example, by placing cold and dense materials (e.g., metal or acrylics that have been frozen at −80° C. or in liquid nitrogen) in contact with the cell-free systems and/or cell-free systems to serve as a cold source during transit to the lyophilizer. The material can have large heat capacity. In some embodiments, the frozen cell-free systems and/or cell-free systems are substantially shielded from light during the lyophilization process. This is particularly useful for protecting components sensitive to light. Instruments for performing lyophilization are commercially available through vendors such as Cole-Parmer and Millrock Technology. In some embodiments, the shelf-stable composition is produced by a process comprising contacting a solid support with an aqueous solution comprising a cell-free system and a cell-free system, and lyophilizing said solid support. In some embodiments, when stored at room temperature (i.e., about 20° C. to 24° C.) and relative humidity of no more than 10%, the composition has a shelf life of at least two weeks, at least one month, at least two months, or at least six months.

A further object of the present invention relates to method of detecting an analyte, comprising: (i) providing the cell-free system of the present invention; (ii) contacting the cell-free system with a sample to be tested for said analyte; and (iii) detecting a signal, wherein detection of said signal indicates the presence of said analyte.

The invention will be further illustrated by the following figures and examples. However, these examples and figures should not be interpreted in any way as limiting the scope of the present invention.

SEQUENCES:

SEQ ID NO: 1
MQQPVVRVGEWLVTPSINQISRNGRQLTLEPRLIDLLVFFAQHSGEVLSR
DELIDNVWKRSIVTNHVVTQSISELRKSLKDNDEDSPVYIATVPKRGYKL
MVPVIWYSEEEGEEIMLSSPPPIPEAVPATDSPSHSLNIQNTATPPEQSP
V

SEQ ID NO: 2
MQQPVVRVGEWLVTPSINQISRNGRQLTLEPRLIDLLVFFAQHSGEVLSR
DELIDNVWKRSIVTNHVVTQSISELRKSLKDNDEDSPVYIATVPKRGYKL
MVPVIWYSEEEGEEIMLSSPPPIPEAVPATDSPSHSLNIQNTATPPEQSP
V*KSKR*

SEQ ID NO: 3
GGPGLLLLLLLLLLLLLLLLGPGG

SEQ ID NO: 4
FTTFWVWFFFLLSLGICVALVAFSSL

SEQ ID NO: 5
ITLIIFGVMAAGVIGTILLISYGI

SEQ ID NO: 6
LLLILLGVLALGVLLTLLLLLLLL

SEQ ID NO: 7
DTRLPMS

SEQ ID NO: 8
MQQPVVRVGEWLVTPSINQISRNGRQLTLEPRLIDLLVFFAQHSGEVLSR
DELIDNVWKRSIVTNHVVTQSISELRKSLKDNDEDSPVYIATVPKRGYKL
MVPVIWYSEEEGEEIMLSSPPPIPEAVPATDSPSHSLNIQNTATPPEQSP
V*KSKRGGPGLLLLLLLLLLLLLLLLGPGGDTRLPMS*

SEQ ID NO: 9
ATCCATTGTAAACATTAAATGTTTATCTTTTCATGATATCAACTTGCGAT
CCTGATGTGTTAATAAAAAACCTCAAGTTCTCACTTACAGAAACTTTTGT
GTTATTTCACCTAATCTTTAGGATTAATCCTTTTTTCGTGAGTAATCTTA
TCGCCAGTTTGG

SEQ ID NO: 10
FTTFWVWFFF LLSLGICVAL VAFSSLDTRL PMS

SEQ ID NO: 11
GGPGLLLLLL LLLLLLLLLL GPGG

SEQ ID NO: 12
GGGSG

SEQ ID NO: 13
MKALTARQQEVFDLIRDHISQTGMPPTRAEIAQRLGFRSASSAEEHLKAL

ARKGVIEIVSGASRGIRLLQEEEEGLPLVGRVAAGEP

SEQ ID NO: 14
QEEEE

SEQ ID NO: 15
CGAGGCTCTTTCCGAAAATAGGGTTGATCTTTGTTGTCACTGGATGTACC

TACATCCATACGGTAACTCACAGGGGCTGG

SEQ ID NO: 16
DTRLPMS

SEQ ID NO: 17
GGGSG

SEQ ID NO: 18
EAAAK

FIGURES

FIG. 1. Schematics of Whole-cell biosensor chimeric receptor design based on membrane bound one component system. The chimeric receptor is composed of three different domain: (a) An analyte binding domain which forms dimer or multimers upon specific binding to target analyte; (b) the *E. coli* CadC transcription factor which is able to be activated through analyte-induced oligomerization of the binding domain; and (C) a transmembrane domain which is responsible for the insertion of chimeric receptor polipeptide into membrane and form correct cytoplasmic N-terminal (CadC transcriptional activator DNA binding domain) and an exoplasmic C-terminus (binding domain) topology. Once the chimeric receptor is bound to target analyte, triggering its oligomerization, the N-terminal CadC DNA binding domain is able to activate downstream signal processing events for further signal output.

FIG. 2. Activation of CadC transcriptional factor by periplasmic domain oligomerization. A. To test if CadC can be activated through periplasmic domain oligomerization, the CadC C-terminal pH sensor domain is replaced by autodimerization leucine zipper GCN4 domain. B. two transmembrane domains are used in our constructs: 1) wild type CadC transmembrane region (wtTM; SEQ ID NO: 10) and 2) artificial 16 leucine transmembrane domain (artTM; SEQ ID NO: 11). Without the C-terminal periplasmic GCN4 leucine zipper, neither CadC-wtTM or CadC-artTM fusion can activate downstream reporter gene GFP expression (CadC-wtTM-only and CadC-artTM-only). On the other hand, the two constructs CadC-wtTM-GCN4 and CadC-artTM-GCN4 which contain C-terminal auto dimerization domain leucine zipper GCN4 can activate downstream reporter gene expression for 50 and 300 fold, respectively.

FIG. 3. Activation of CadC transcriptional factor via analyte-induced binding domain oligomerization. To test if our chimeric receptor can be activated through analyte induced binding domain oligomerization, the CadC transcriptional factor DNA binding domain was fused to $V_HH$-caffeine, a VHH camelid antibody which can be dimerized upon binding to caffeine. The VHRnase, a VHH using the same scaffold which can recognize protein Rnase was used as our negative control. As shown here, only the construct CadC-artTM-$V_H$Hcafe can be activated by the presence of 1 mM caffeine with a fold change in gene expression of about 200 folds.

FIG. 4. Dose-dependent response of the CadC-artTM-$V_H$Hcafe chimeric receptor to caffeine. Cells expressing the CadC-artTM-$V_H$Hcafe (20 uM IPTG induction) construct were incubated into different concentrations of caffeine. After 16 hours, the fluorescence was quantified using a flow-cytometer. Cells display an increase in fluorescence correlated to increasing caffeine concentrations.

FIG. 5: General representation of the LexA-VHHcafe pLexA-deGFP system. The expression of the LexA-VHH-cafe gene leads to the production split-domain DNA binding (DBD) molecules, LexA, fused with a monomeric antibody, VHHcafe. The dimerization of two molecules is induced by the presence of a caffeine molecule. The homodimer binds to the operator of the pLexA promoter and represses the expression of deGFP.

FIG. 6: General representation of the LexA-Lam4 DsRed system. The expression of the LexA-Lam4 gene leads to the production of DBD molecules, LexA, fused with a monomeric antibody, Lam4. The dimerization of two molecules is induced by the presence of a DsRed molecule. The homodimer binds to the operator of the pLexA promoter and represses the expression of deGFP.

EXAMPLE 1

Materials and Methods

Figure 1:
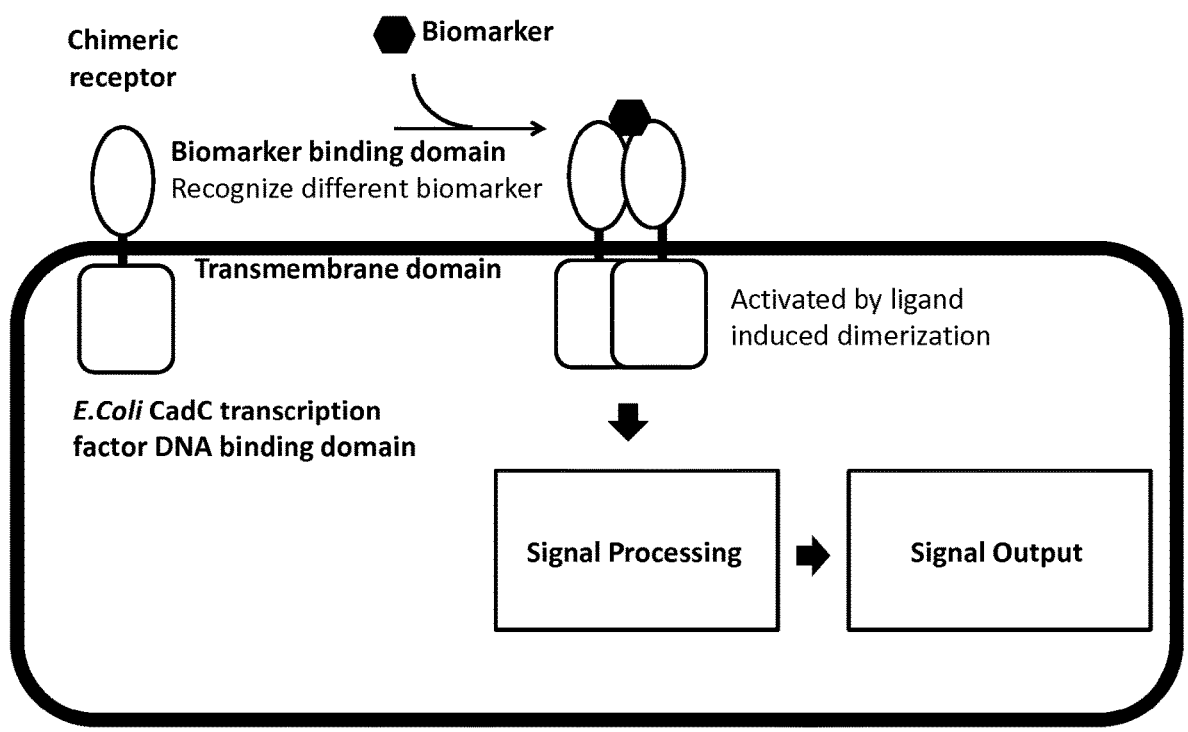

Bacterial Strains, Plasmids, and Materials.

CadC and LexA transcriptional factor DNA binding domain, Leucine zipper GCN4, $V_H$Hcafe and $V_H$HRNase were synthesized by INTEGRATED DNA TECHNOLOGIES® (IDT®). Different DNA components such as GFP reporter, CadBA promoter, pLexA promoter and CadC variants were constructed into BIOBRICK® standard vector pSB4K5 by Gibson assembly methods. The resulting constructs were transformed into *E. coli* strain NEB®10beta (NEW ENGLAND BIOLABS®, NEB®) and determined their performance. In all constructs, the expression level of CadC variants are under the control of pLac-1 promoter, which can be induced by IPTG. The CadC variants control the expression of reporter GFP through pCadBA promoter.

Design and Construction of CadC Variants

The sequence details of each construct are listed in supplementary information. The construct CadC operation unit with CadC-wtTM-GCN4 was built first as template for further replacement by other CadC variants. Three pairs of primers (see primer details) were used to amplify three gene blocks with 40 bp overlap regions. These components were further assembled by Gibson assembly methods.

Generating PCR Amplified Blocks for CadC Operation Unit

The PCR amplification was carried out in a 40 µl reaction mixture consisting of 0.1~10 ng of template DNA fragment, 1 µl of each forward/reversed primer (20 µM), and 20 µL of Q5 hot start high-fidelity 2× master mix (NEB®). After 30 seconds of initial denaturation at 98° C., 35 cycles were conducted with the PCR procedures of 10 seconds at 98° C., 30 seconds at corresponding annealing temperature (different with each primer combination, calculated with NEB® Tm calculator: tmcalculator.neb.com/#!/), and elongation (2 kb/min) at 72° C., with a final extension at 72° C. for 10 minutes. The PCR product was verified by gel electrophoresis, then purified by PCR clean up kit and determined the DNA concentration by NANODROP® spectrophotometer.

Gibson Assembly and Electrotransformation

The DNA templates from *E. coli* in the purified PCR product was further digested with 1 μl DpnI (20 units/μl, NEB®) in 40 μl CUTSMART® reaction buffer (NEB®) at 37° C. for 1 hours. The resulting product was applied to Gibson assembly reaction directly. In each Gibson assembly reaction, 100 ng of vector DNA fragment and 3-5 folds of insert fragments was incubated with 10 μl of 2× Gibson assembly master mix (NEB) in a final volume of 20 μL at 50° C. for 60 minutes. To prevent the DNA ligase activity in the reaction mix affecting the following electroporation efficiency, the reaction mix was further heat inactivated at 80° C. for 15 minutes. 1 μl of Gibson assembly products was added into 40 μl NEB®10beta electro-competent cells and then transferred into the BIO-RAD® 0.1 cm gap MICROPULSER™ electroporation cuvettes. Right after electroporation with BIO-RAD® MICROPULSER™ electroporator and program EC1, 1 mL of prewarmed (37° C.) SOC medium was added into the transformants immediately. The cell culture was further incubated in 37° C. incubator with vigorous shaking for one more hour for rescuing the cells. The transformant was then plated on the selection plate with antibiotics (ex. kanamycin) and incubated at 37° C. overnight. The constructs were further verified by Sanger sequencing.

In Vivo Characterization

Pick a single colony of CadC operating unit variant into 3 mL of LB/kanamycin medium and incubate in 37° C. overnight with vigorous shaking. The overnight culture is further diluted 100 fold into 3 mL of LB/kanamycin medium and incubated in 37° C. for 4 hours to reach to exponential phase (O.D=0.4~0.6). The culture in exponential phase was further diluted 50 fold into mediums containing inducer 1 mM IPTG (for experiment: Activation of CadC transcriptional factor by periplasmic domain oligomerization) or 1 mM IPTG/1 mM caffeine (for experiment: activation of CadC transcriptional factor by analyte induced binding domain oligomerization), and then incubated at 37° C. overnight with vigorous shaking. The resulting cell culture was further analyzed with ATTUNE® NxT flow cytometer.

Designing a synthetic biosensor using split DNA-Binding domains. DNA binding of transcriptional regulators is generally dependent on dimerization of the DBD through the LBD. Deletion of the LBD/dimerization domain lead to an inactive, monomeric DBDs which function can be restored via dimerization driven by fusion proteins of interest. In order to engineer our split-DBD system, we used the DBD of LexA, a well-characterized transcriptional repressor which regulates the transcription of genes involved in *E. coli* SOS response. Upon induction of the SOS response, RecA promotes LexA inactivation through self-cleavage at residue 85, a flexible hinge between DNA-binding and dimerization domains. The repressive activity of the monomeric LexA DBD can be restored by forcing its dimerization through fusion with leucine zippers. LexA DBD was used in two-hybrid screens to probe protein-protein. In order to prevent interference from endogenous *E. coli* LexA, we used the mutant LexA-408, and its corresponding promoter which is not recognized by the wild type LexA. We fused LexA DBD to a monomeric LBD that undergoes ligand-induced homodimerization. Thus, in the presence of ligand, LexA DBD should be able to bind DNA and repress target gene expression.

Choice of a synthetic ligand binding domain. In order to develop a scalable receptor platform, we set several criteria for selecting an ideal LBD scaffold: (i) potential for further engineering to bind many different ligands, and of different types (e.g. proteins, small molecules); (ii) high solubility and stability; and (iii) low propensity to aggregate to ensure monomeric state before ligand binding. Antibodies are an ideal scaffold to detect various kinds of ligands and can be applied to different therapeutic or diagnosis applications. However, IgGs have poor expression levels in prokaryotic system. To counter this problem, researchers have developed single domain antibodies, such as Camelid VHHs, or antibody mimetics like monobodies, DARPin®s (designed ankyrin repeat proteins), or alphaReps that are well expressed in prokaryotic systems with high stability and solubility, and for which combinatorial libraries can be selected to target many different antigens. We thus decided to use a synthetic antibody that could undergo monomer-to-dimer transition upon ligand binding. To establish our proof-of-concept, and because of the limited membrane permeability to proteins, we searched for an antibody targeting a small diffusible molecule. We used a single-domain VHH camelid antibody that can be dimerized upon binding to its ligand caffeine (termed VHH-Caffeine from herein). As a negative control we chose a VHH targeting RNase A (termed VHH-Control from herein).

Detection of caffeine using a LexA-VHH fusion. We built two chimeric proteins, expressed in *E. coli* cytoplasm, composed of an N-terminal LexA DBD and a C-terminal VHH, and placed their expression under the control of the pLacO1 promoter induced by isopropyl β-D-1-thiogalactopyranoside (IPTG). As a reporter, we used the Green Fluorescent Protein (GFP) driven by the LexA promoter. As positive and negative controls, we expressed full-length LexA and LexA DBD. As expected, we observed that full-length LexA mediated-repression increased with IPTG concentration and was not affected by caffeine (data not shown). We also observed that the LexA DBD was capable of gene repression a high concentration (14% and 35% repression at 50 μM and 100 μM IPTG, respectively, data not shown). We then characterized the behavior of cells expressing LexAVHH-Caffeine and LexA-VHH-Control in response to increasing concentrations of IPTG and caffeine (data not shown). We confirmed by Western blot (WB) that both fusion proteins were expressed at similar levels (data not shown). We first observed that similarly to LexADBD, the fusion proteins LexA-VHH-Caffeine and LexA-VHH-Control displayed a concentration-dependent repressive activity (30% and 45% at 50 μM and 100 μM IPTG induction, respectively, data not shown). LexA-VHH-Caffeine and LexAVHH-Control had a comparable repressive activity to LexADBD at a similar IPTG concentration, suggesting that this repressive effect is primarily due to the DBD and that VHHs are in a monomeric state in the cytoplasm. We then monitored the response of the LexA-VHH fusions to increasing concentrations of caffeine at different IPTG concentrations. While no change was detectable in response to cafeine for LexA-VHH-Control (data not shown), LexA-VHHCaffeine had a dose-dependent response to caffeine starting at 25 μM IPTG concentration and 100 nM caffeine (data not shown). These results show that in the presence of its ligand, VHH-Caffeine dimerizes and restores LexA DNA-binding activity, leading to reporter gene repression. Response to caffeine was homogenous among the whole cell population (data not shown). We calculated the fold repression of LexA-VHH-Caffeine. We found that the higher repression fold (4.3-fold) was at 100 μM IPTG induction (data not shown). LexA-VHHCaffeine had a repression activity comparable to full-length lexA at similar protein expression levels (respectively 100 and 12.5 μM IPTG concentration). We also calculated the swing values (i.e. the absolute change in fluorescence intensity between inactive and active states), and found that the best swing (15 RPUs) was at 25 µM IPTG and 100 µM caffeine (data not shown). However, higher expression of LexA-VHH-Caffeine was needed to detect lower concentration of caffeine. Because monitoring a signal increase is more practical for a biosensor assay, we then connected our system to a genetic inverter based on the BetI repressor (data not shown). Starting at 50 µM IPTG induction, we observed a marked increased in GFP intensity (data not shown). While the swing was lower than with the repressor only system (2.2 RPUs vs 12.2 RPUs at 100 µM IPTG, respectively), the fold change was still significant, (4-fold, data not shown), due to the very low background signal in the absence of caffeine. Interestingly, we found that there was only a slight change in GFP signal across increasing concentrations of IPTG (from 0.6 RPU at 0 µM IPTG to 0.7 RPU at 100 µM IPTG). We hypothesize that the inverter module buffers the non-specific repressive effect of the DBD at high concentrations, probably because of the delay required to degrade the BetI repressor. These results demonstrate that split-DBDs can be used to engineer synthetic receptors activated via ligand-induced dimerization of antibody-based LBD.

EXAMPLE 2

Figure 2A:
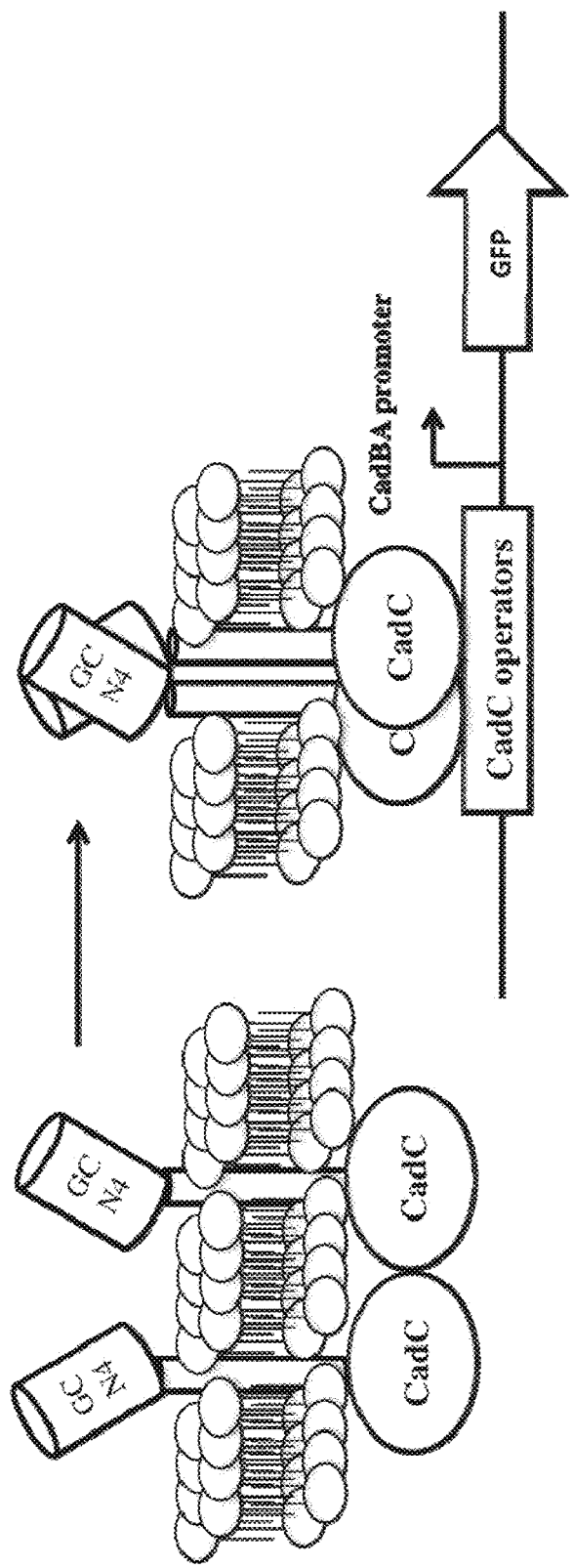
Figure 2B:
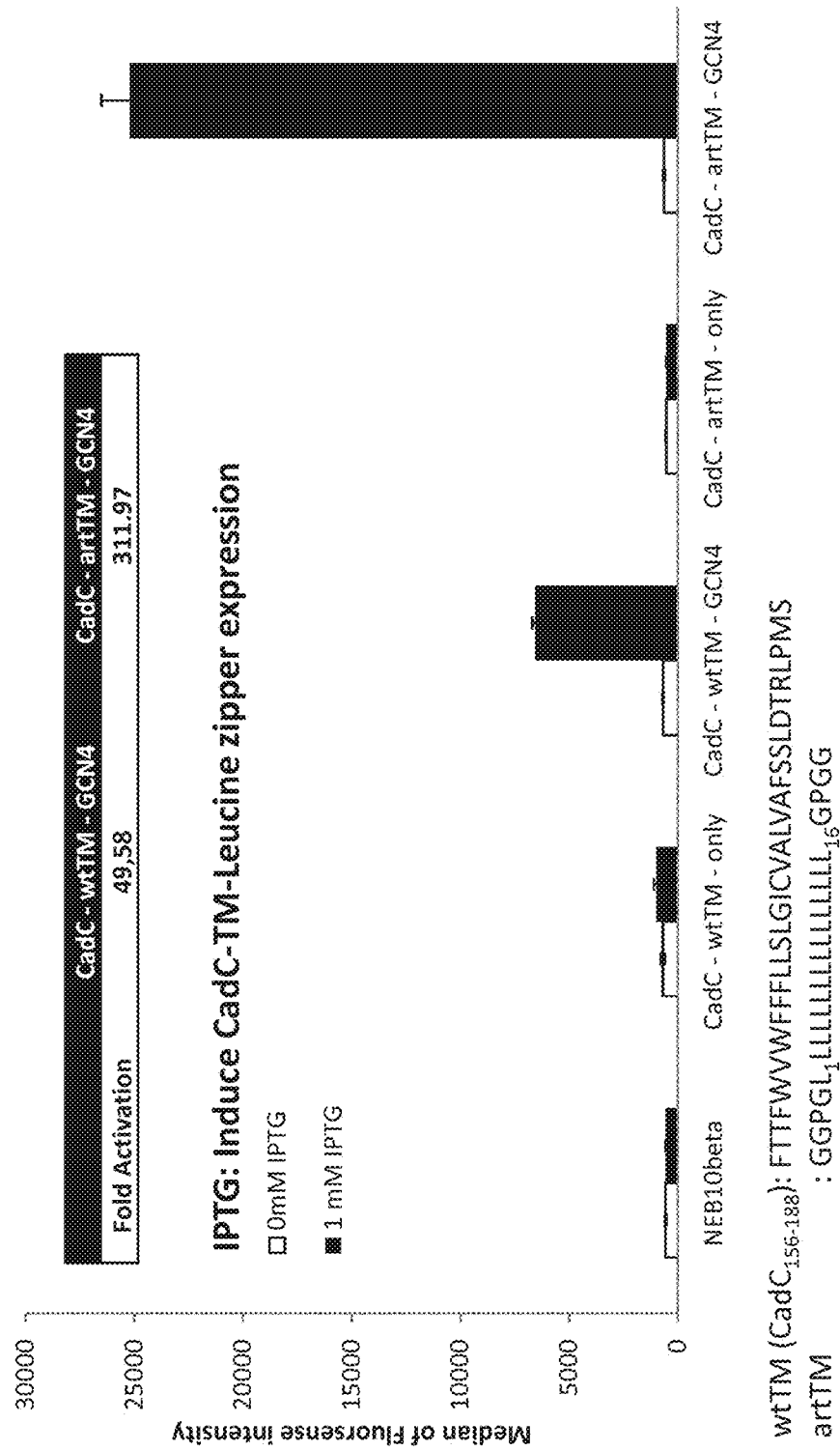
Figure 3A:
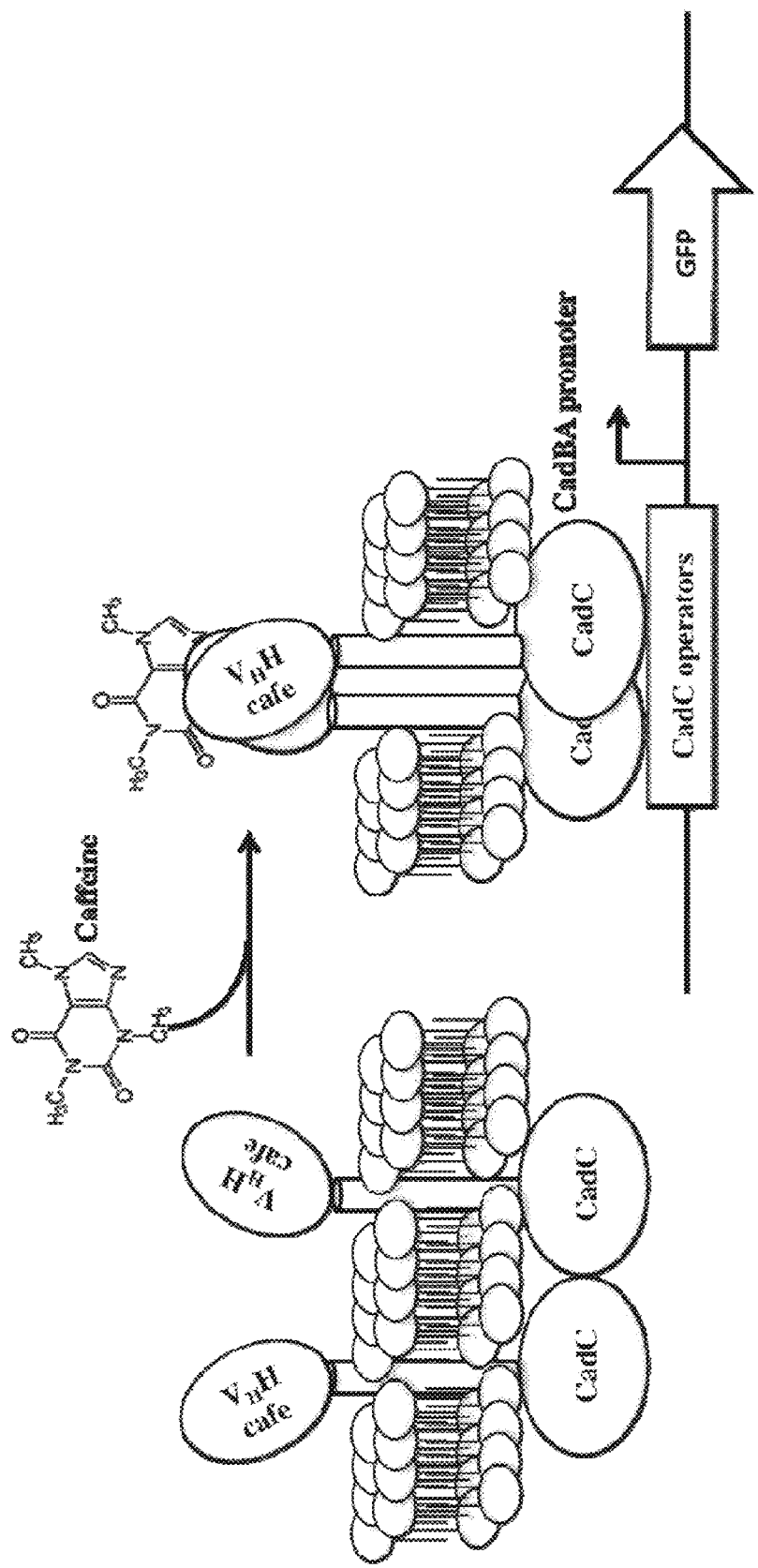
Figure 3B:
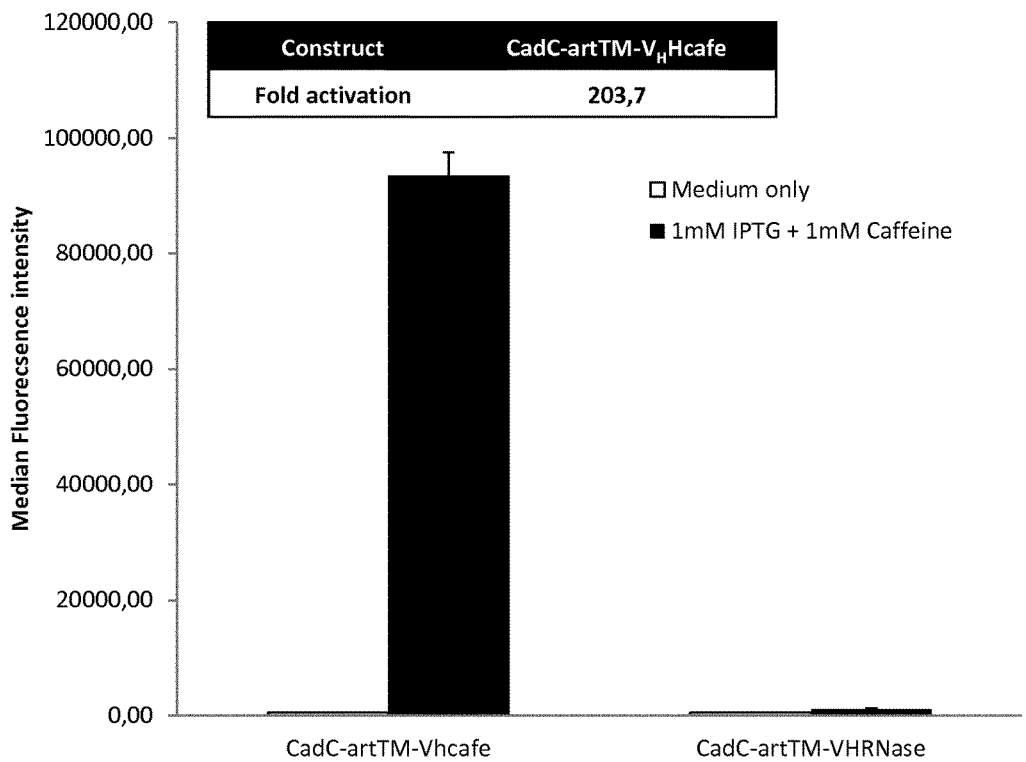
Figure 4:
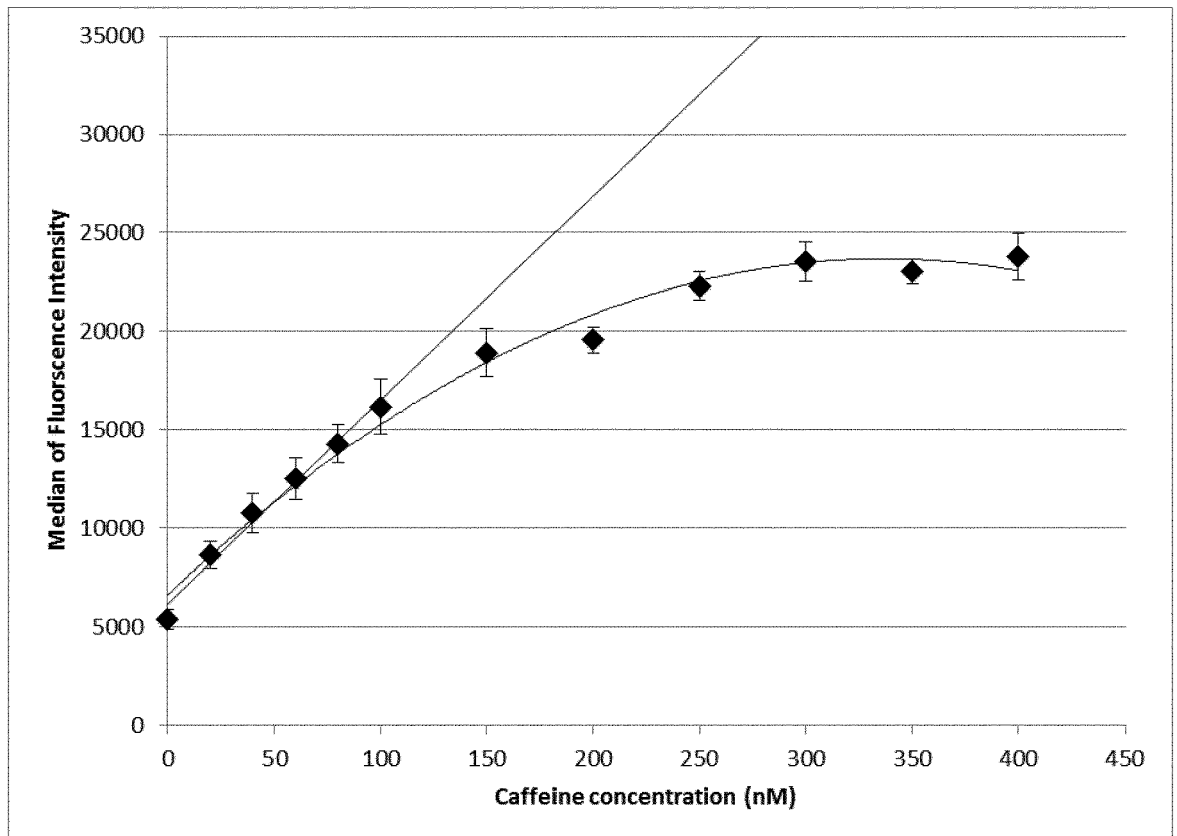

Artificial Dimerization of the Cade DNA Binding Domain Via Leucine Zippers Induces Gene Expression Here we fused the CadC DNA binding domain with the wild-type CadC transmembrane region or with an artificial transmembrane region. We then fused these two scaffolds with the GCN4 homodimerizing leucine zipper. We show that while in the abscence of GCN4, nosignal is observed, the constructs fused with GCN4 are able to trigger GFP expression (FIG. 2). Interestingly, the construct using GCN4 fused to the wt CadC transmembrane region produce a ~50 fold change in GFP expression compare to the construct without GCN4, while the construct using the artificial TM produce a 300 folds fold change.

While previously it had been demonstrated that forcing dimerization of the CadC DNA binding domain via self-dimerizing transmembrane helixes could trigger downstream gene expression, this is the first demonstration, to our knowledge, that the CadC DNA binding domain and downstream gene expression can be activated via dimerization of an extracellular dimerization domain. Moreover, we demonstrate that the transmembrane region sequence can greaty affect the efficiency of activation.

EXAMPLE 3

Engineering a synthetic transmembrane receptor using CadC DBD and a VHH ligand binding domain. One current limitation of whole cell biosensors is the difficulty to detect large biological molecules such as proteins that cannot cross the cellular membrane. While synthetic transmembrane receptors have been developed in mammalian cells, no scalable receptor platform for soluble extracellular ligand detection have been reported in microorganisms, a robust chassis for whole-cell biosensing. We thus aimed at engineering chimeric transmembrane receptors exploiting the principle of split-DBDs. We looked for existing E. coli transmembrane transcription regulators and turned to CadC, a transcriptional activator from the ToxR family. CadC is composed of a N-terminal cytosolic DBD and a C-terminal periplasmic pH sensor domain. It activates the pCadBA promoter when environmental pH decreases and in the presence of lysine. Interestingly, dimerization of transmembrane helixes bound to the cytosolic CadC DNA binding domain is sufficien to restore CadC transcriptional activity. We thus aimed to restore CadC activity through ligand-induced dimerization of a periplasmic sensor domain. In order to remove endogenous regulations by the Lysine permease LysP, we used an artificial transmembrane domain composed of 16 Leucine repeat. We fused the self-dimerizing leucine-zipper GCN4 to the periplasmic C-terminus of CadC and observed that cells CadCLeu TM-GCN4 produced a strong GFP signal, confirming that dimerization alone was able to restore the function of CadC (data not shown). We then built two CadC-VHH fusion proteins composed of CadC DBD, CadC juxtamembrane domain (JM), the Leu(16)TM, CadC wild type external linker region (EL), and the VHH ligand binding domain (data not shown), and placed their expression under the control of the pLacO1 promoter (data not shown). Both fusion proteins had similar expression levels across the IPTG concentration range (data not shown). We observed, as the LexA system, that the CadC-VHH-Caffeine construct exhibited nonspecific activation at high IPTG concentrations (from 0.6 to 5.6 RPUs, about a 9-fold increase), while the CadC-VHH-Control fusion did not (data not shown). Because both receptors are expressed at the same levels, these results suggest that the VHHCaffeine expressed at the membrane has a higher propensity to oligomerize than the VHH-Control. Despite receptor self-activation, we observed a strong response of CadC-VHH-Caffeine to increasing concentrations of caffeine, starting at 25 µM IPTG concentration and above (data not shown). VHH Control did not show any change in GFP signal. We calculated the signal swing and fold change in response to caffeine (data not shown). We found that at 100 µM caffeine, the swing increased with increasing receptor expression (swing=6, 19, 21 RPU at 25, 50 and 100 µM IPTG, respectively, data not shown). However, the fold change was maximal at 25 µM IPTG (10-fold), and decreased with IPTG concentrations above (Fold change=6- and 4.6-fold at 50 and 100 µM IPTG respectively, data not shown). This decrease in fold change is explained by a higher background noise due to non-specific receptor activation at higher expression levels. Thus, even though a higher level of expression of CadC-VHH-Caffeine increases the cell sensitivity to caffeine, this overexpression also increases non-specific self activation, and consequently decreases the signal-to-noise ratio. However, cell induced at 25 µM IPTG induction had a bimodal distribution while at 50 µM the response to cafeine was homogeneous over the whole cell population (data not shown). Therefore, receptor expression needs to be balanced to satisfy two criteria: support homogenous response while minimizing self activation and background noise. These results demonstrate that a synthetic transmembrane receptor can be engineered by fusing a split-DBDs with a periplasmic VHH scaffold. Receptor expression levels strongly influences sensitivity and signal-to-noise ratios.

Optimizing transmembrane receptor signal-to-noise ratio through linkers engineering. We then wanted to improve the signal-to-noise ratio of our system by educing its background noise. We assumed that improper linker sequence composition may favor receptor non-specific oligomerization and activation. We thus modified the amino acid composition of the external linker region, which was shown to influence receptor basal activation rate as well as signal-to-noise ratio. We switched the wild type CadC external linker (DTRLPMS (SEQ ID NO:16), wt) to a flexible (GGGSG (SEQ ID NO:17)) or rigid (EAAAK (SEQ ID NO:18))

linker sequences. We also completely removed the linker region (no linker, NL) (data not shown). We tested the self-activation level of the external linker variants along with their response to 100 µM caffeine at 50 µM IPTG (data not shown). We observed similar responses to caffeine from CadC-VHHCaffeine with wt or flexible external linkers while the construct with a rigid external linker had no response (data not shown). Finally, we observed a significant reduction of self-activation along with a slight decrease of signal activation from the construct in which the external linker region had been removed (data not shown). While the signal swing of the NL construct was slightly lower, the fold change was more than tripled compared to the wt construct (5 vs 16-fold change, respectively, data not shown). We found via WB analysis that the wt, flexible, and NL constructs had similar expression levels while the construct with the rigid linker was strongly proteolysed, explaining the total loss in activity of this variant (data not shown). We mapped in more details the response range of CadCVHH-Caffeine NL version (data not shown). We observed a marked improvement of the receptor fold change in response to lower caffeine concentration. For example, at 50 µM IPTG induction, the NL version displayed a 3.6-fold change in response to 100 nM caffeine, while the wt construct showed only a 2.8-fold change. This effect was even stronger at 1 µM caffeine (NL=8-foldchange vs wt=5), 10 µM caffeine (12.6 vs 5.7). We were therefore able to obtain receptors showing strong signal swing in response to caffeine while having a better S/N ratio. These results demonstrate that chimeric transmembrane receptor response can be tuned by optimizing interdomain linker sequences.

EXAMPLE 4

Transmembrane receptor mediated-detection of extracellular proteins using L-form bacteria. Many biosensing applications like medical diagnostics require the detection of large molecules like protein biomarkers of diseases. However, the CadC transmembrane receptor system is expressed in the inner membrane of *E. coli*, limiting its accessibility to these large molecules. Nonetheless, the transmembrane receptor should be able to detect such ligands if its sensing domain was directly exposed to the extracellular environment. To demonstrate this possibility, we decided to use L-form *E. coli*, an outer membrane deficient form of *E. coli*. L-form bacteria were first isolated in 1935 as osmosensitive, spherical bacterial due to their lack of intact cell wall. L-forms can be generated transiently with antibiotics that inhibit peptidoglycan synthesis or disrupt cell wall formation or permanently by mutation of genes related to peptidoglycan synthesis. Because of their lack of outer membrane, Lform bacteria could be suitable candidates for developing whole cell biosensors to detect large molecules such as proteins. We prepared L-form *E. coli* by growing cells in osmoprotective media with the antibiotic cefsulodin, which disrupt cell wall synthesis by inhibiting penicillin binding protein (PBP) crosslinking of peptidoglycan (data not shown). We confirmed via microscopic observation that cells had the characteristic spherical shape of L-form (data not shown). We confirmed that our receptor was still functional by adding IPTG and caffeine to the cells and monitoring expression of the fluorescent reporter (data not shown). Thanks to the outer membrane deficiency, we also confirmed that the receptor was effectively targeted to the inner membrane via immunofluorescent labeling (data not shown). We then tested if our receptor could bind and be activated by large protein ligands by monitoring its response to an antibody. Antibodies are a relevant class of biomarkers that can be used to diagnose infections or autoimmune diseases. Because antibodies are multivalent, binding of an antibody to the extracellular domain of the receptor should trigger its multimerization and lead to receptor activation. As a proof-of-concept, because our VHHs have a c-Myc tag in C-terminus, we aimed at detecting the anti-c-Myc antibody. We incubated L-form *E. coli* expressing NL version of CadC-VHHCaffeine with 10 µg/ml (66 nM) anti-c-Myc antibody (data not shown). We observed an increase in GFP signal of 3-fold from Lform bacteria incubated with the c-Myc antibody (data not shown). This response was dependent on the presence of the receptor as signal increase was observed only in the presence of IPTG. Finally, we did not observe any signal increase when we incubated untreated *E. coli* with the anti-c-Myc antibody (data not shown). These results demonstrate that a bacterial chimeric transmembrane receptor can be used to detect protein ligands in the extracellular environment, and that L-form bacteria might be a suitable format for such applications.

EXAMPLE 5

Introduction

Figure 5:
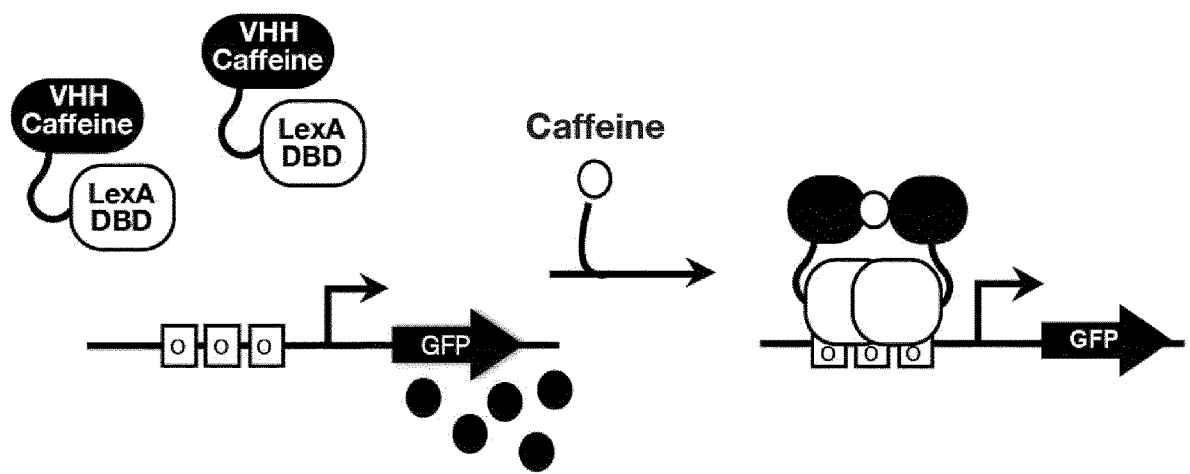
Figure 6:
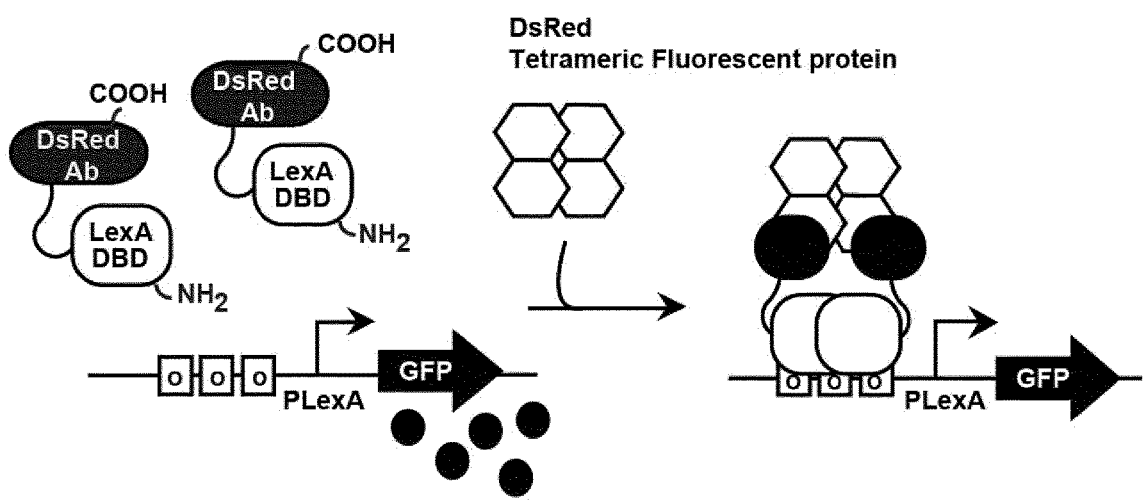

First of all, in order to validate the usefulness of our chimeric receptor polypeptide in a cell free system, we tested a system used in vivo based on dimerization activation. Mono-domain antibodies, VHH-caffeine, are activated by binding a ligand, caffeine, which induces their homodimerization. These antibodies are fused with monomeric DNA binding domains (LexA-DBD) which, with their dimerization, bind to the operator of the pLexA promoter repress the expression of a GFP reporter gene (FIG. 5). In a second step, we tested a system using a larger ligand, DsRed. It is a tetrameric protein that emits red fluorescence. Lam4 VHHs dimerized by the binding of the DsRed ligand. As in the previous system, the antibodies are fused to with LexA-DBD. The Lam4-induced LexA-DBD dimerization then allows binding of the complex to the operator of the pLexA promoter and leads to repression of the expression of deGFP (FIG. 6).

Methods

Plasmid Preparation: Genes encoding the GFP reporter, LexA-DBD-VHHcafe as well as LexA-DBD-Lam4 were cloned as described in Birnboim H C, Doly J. *A rapid alkaline extraction procedure for screening recombinant plasmid DNA. Nucleic Acids Res.* 1979; 7:1513-1523. All the amplification was done in *E. coli*. Plasmid purification was performed with QIAGEN® kits.

Preparation of cell extracts: The process took 4 to 5 days, according to the protocol made available on jove.com (Sun Z Z, Hayes C A, Shin J, Caschera F, Murray R M, Noireaux V. *Protocols for implementing an Escherichia coli based TX-TL cell-free expression system for synthetic biology. J Vis Exp.* 2013; e50762). First of all, the strain of *E. coli* was cultured on agar plate in presence of an antibiotic for selection, and the culture medium is prepared. Then the amplification was done in the culture medium. The cultures were centrifuged and washed out. Finally, the cells were lysed. The calibration of the extracts, the optimization of glutamate, DTT as well as magnesium concentrations are finally carried out.

Kinetic data collection by plate reading: The samples are put in a 384 well plate. CYTATION3® plate reader is used to record the fluorescence emitted from the GFP wavelength (528 nm) and the RFP for DsRed fluorescence (620 nm). The machine is programmed at 30° C. and the fluorescence is read for 16 hours at 10 minute intervals.

Results

Figure 7:
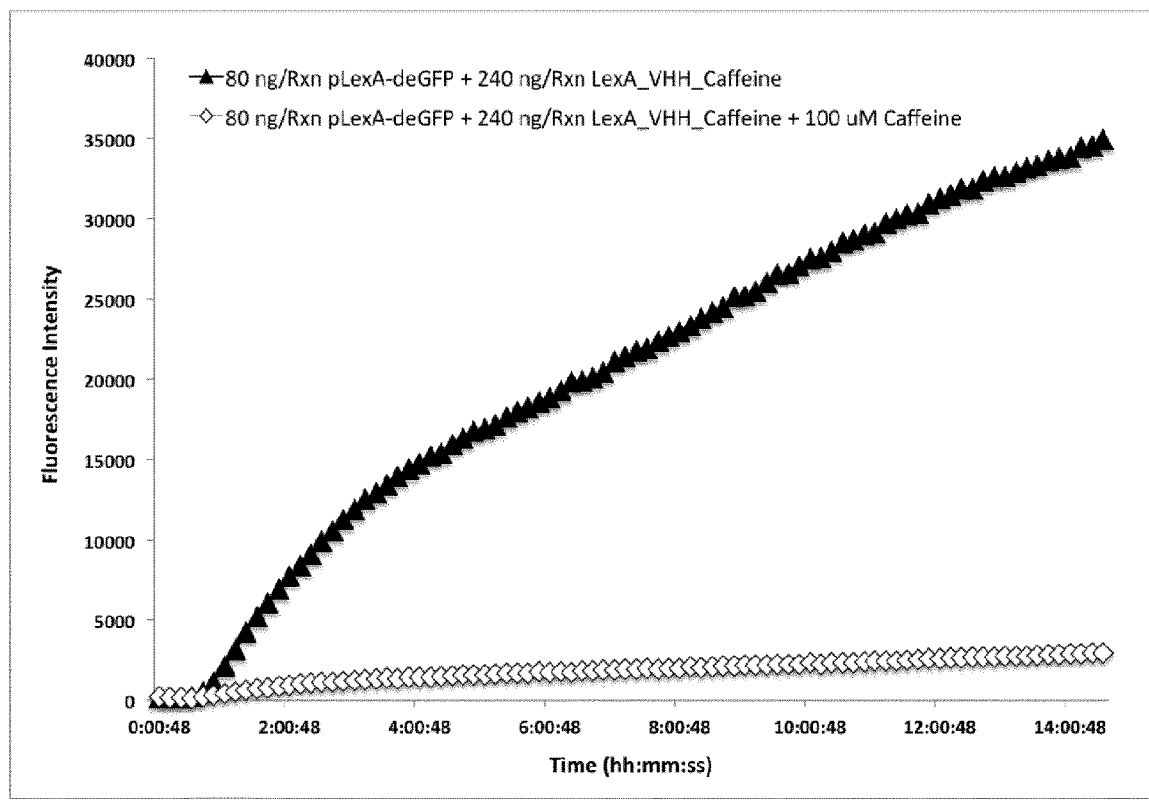
FIG. 7 shows the expression of deGFP in presence or absence of caffeine.

Validation of the in vitro system: We analysed the intensity of the fluorescence emitted by the expression of the deGFP by the reporter gene. We tested the influence of a growing range of LexA-VHHcafe plasmid on the expression of deGFP, with and without caffeine in the medium (FIG. 7). We observed that when the pLexA-deGFP plasmid concentration is under 240 ng, the signal of the reporter deGFP is affected by the presence of caffeine. For a concentration of 80 ng of pLexA-deGFP plasmid without caffeine the measured signal is 34,944 ua. When 100 µM caffeine is added in the reaction, this signal drops to 2930 u.a, ie less than 10% of the positive control. We also find that when the concentration of LexA-VHHcafe plasmid is above 240 ng/reaction, the expressed DBD-antibody dimerizes without binding a caffeine molecule. This effect had already been observed in vivo. Accordingly, with said conditions that we have optimized, we can conclude that this biosensor system works. The Cell-Free platform makes it possible to express functional proteins that can dimerize through ligand detection and binding and suppress expression of the deGFP.

Figure 8:
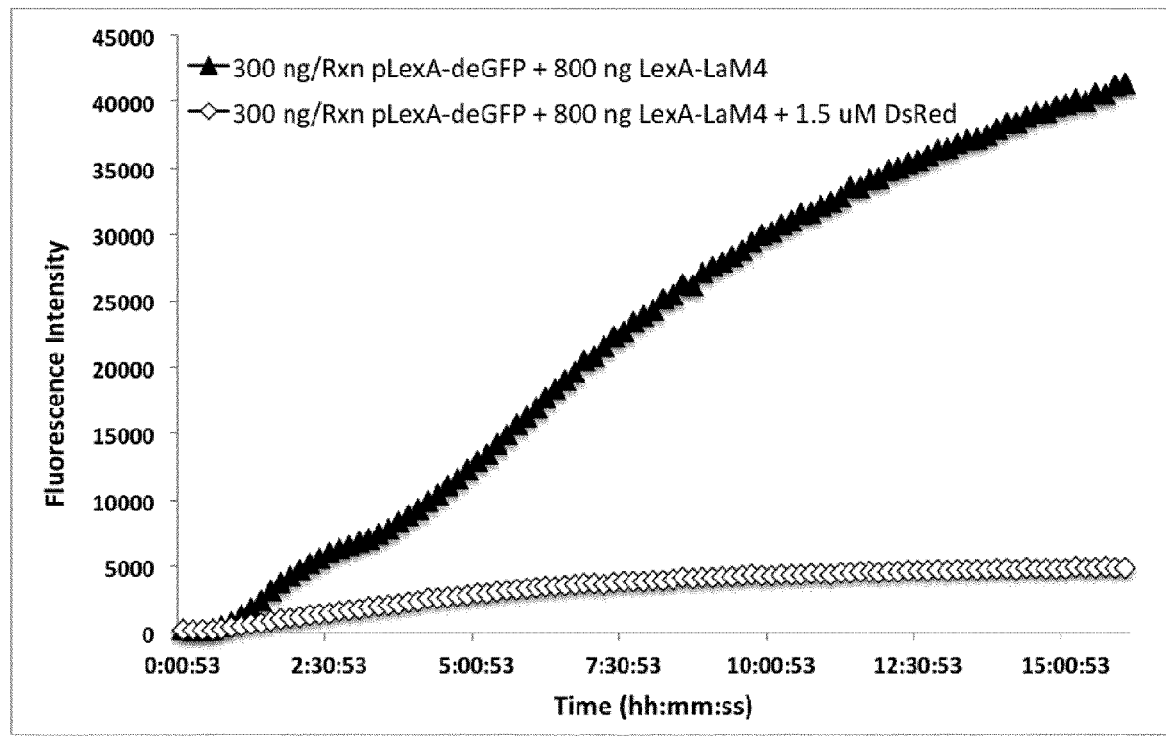
FIG. 8 shows the expression of deGFP in presence or absence of DsRed.

Detection of a larger ligand, DsRed: As for the previous system, we detected the fluorescence emitted by the expression of deGFP by the pLexA-deGFP reporter gene (FIG. 8). We tested the influence of a growing range of LexA-Lam4 plasmid on the expression of deGFP, with and without DsRed in the medium. For this system, we do not have significant ligand interference on the reporter signal when the plasmid pLex-deGFP concentration is above 100 ng/reaction. For concentrations of 300 ng/reporter reaction and 800 ng/reaction of LexA-Lam4, we can see a ratio of ~ 8.5 between signal strength with (4853 a.u.) and without DsRed (41380 a.u.) in the medium. We can conclude that this system also works on the Cell-Free platform. This is very promising for the detection of large molecules by biosensors. The Cell-Free platform will be able to facilitate detection of large molecules and improve diagnosis. In addition, the double dimerization model put forward here, the DNA binding domain and the monomeric antibody, offers great opportunities.

REFERENCES

Throughout this application, various references describe the state of the art to which this invention pertains. The disclosures of these references are hereby incorporated by reference into the present disclosure.

The invention claimed is:

1. A chimeric receptor polypeptide comprising (i) a first DNA binding domain, wherein the first DNA binding domain consists of an amino acid sequence with at least 75% identity with SEQ ID NO:1, SEQ ID NO: 2, SEQ ID NO: 8, or SEQ ID NO: 13, (ii) at least one binding domain having specificity for an analyte of interest, wherein the binding domain is a single domain antibody selected from the group consisting of a heavy chain variable domain and a camelid VHH, and (iii) a linker between the first DNA binding domain and the at least one binding domain, wherein the linker consists of an amino acid sequence with at least 90% identity with SEQ ID NO:3, SEQ ID NO: 4, SEQ ID NO: 5 or SEQ ID NO: 6.

2. The chimeric receptor polypeptide of claim 1 further comprising a spacer inserted between the linker and the at least one binding domain.

3. The chimeric receptor polypeptide of claim 2 wherein the spacer comprises the amino acid sequence DTRLPMS (SEQ ID NO:7) or GGGSG (SEQ ID NO:12).

4. The chimeric receptor polypeptide of claim 1, wherein the analyte of interest is a small molecule.

5. A cell-free system comprising the chimeric receptor polypeptide of claim 1.

6. The cell-free system of claim 5 wherein the chimeric receptor polypeptide is embedded partially or completely in a solid support.

7. The cell-free system of claim 6 wherein the solid support is a porous substrate.

8. The cell-free system of claim 6 wherein the solid support is paper.

9. The cell-free system of claim 6 wherein the solid support comprises several spatially distinct reaction regions where the cell-free system is confined.

10. The cell-free system of claim 6 wherein the components are lyophilized on the solid support.

11. The cell-free system of claim 5 further comprising a reporter gene.

12. The cell-free system of claim 11 wherein the reporter gene encodes a fluorescent protein.

* * * * *